United States Patent
Hu et al.

(10) Patent No.: US 12,407,938 B1
(45) Date of Patent: Sep. 2, 2025

(54) ADAPTIVE SYNCHRONIZATION FOR AUTOMATIC EXPOSURE CONTROL (AEC)

(71) Applicant: QUALCOMM Incorporated, San Diego, CA (US)

(72) Inventors: Chih-Hau Hu, Taipei (TW); Wen-Chun Feng, New Taipei (TW); Wei-Chih Liu, Taipei (TW); Wei-Te Chang, Taipei (TW)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 18/582,050

(22) Filed: Feb. 20, 2024

(51) Int. Cl.
*H04N 23/73* (2023.01)
*H04N 23/71* (2023.01)

(52) U.S. Cl.
CPC ............. *H04N 23/73* (2023.01); *H04N 23/71* (2023.01)

(58) Field of Classification Search
CPC ............................... H04N 23/73; H04N 23/07
USPC ....................................................... 348/222.1
See application file for complete search history.

(56) References Cited

U.S. PATENT DOCUMENTS

| | | | | |
|---|---|---|---|---|
| 6,639,626 | B1* | 10/2003 | Kubo | H04N 23/667 |
| | | | | 348/222.1 |
| 11,070,736 | B2* | 7/2021 | Lee | H04N 23/681 |
| 2020/0320661 | A1* | 10/2020 | Lin | H04N 23/672 |
| 2023/0269486 | A1* | 8/2023 | Xiao | H04N 23/73 |
| | | | | 348/222.1 |

FOREIGN PATENT DOCUMENTS

WO WO-2016178712 A1 * 11/2016 ............. H04N 23/74

* cited by examiner

*Primary Examiner* — Lin Ye
(74) *Attorney, Agent, or Firm* — QUALCOMM Incorporated

(57) ABSTRACT

Systems and techniques are described herein for image processing. For example, a computing device can determine a first exposure relationship between an exposure of a first image frame from a first camera of a multi-camera system and an exposure of a second image frame from a second camera of the multi-camera system. The multi-camera system includes a plurality of cameras (including the first camera and the second camera). The computing device can determine a second exposure relationship between an exposure of a third image frame from the first camera and an exposure of a fourth image frame from the second camera. The computing device can determine a difference between the first exposure relationship and the second exposure relationship. The computing device can apply, based on a comparison of the difference to a threshold value, first exposure statistics of the first camera to the plurality of cameras.

20 Claims, 15 Drawing Sheets

| FPS 410 | Normal [mW] 420 | | MCSS with Deep Sleep [mW] 430 | MCSS/Normal Ratio 440 |
|---|---|---|---|---|
| 15 | 241.8 | -2% | 237.5 | 0.98 |
| 10 | 190.5 | -13% | 165.4 | 0.87 |
| 5 | 141.5 | -32% | 96.1 | 0.68 |

FIG. 4

The configured exposure can be reflected on the n+3 frames. Compared with the graph in FIG. 12, the graph in FIG. 11 shows much faster results and also closer to the final converged value.

ADAPTIVE SYNCHRONIZATION FOR AUTOMATIC EXPOSURE CONTROL (AEC)

FIELD

The present disclosure generally relates to image processing. For example, aspects of the present disclosure relate to providing adaptive synchronization for automatic exposure control (AEC).

BACKGROUND

The increasing versatility of digital camera products has allowed digital cameras to be integrated into a wide array of devices and has expanded their use to different applications. For example, phones, drones, cars, computers, televisions, and many other devices today are often equipped with camera devices. The camera devices allow users to capture images and/or video (e.g., including frames of images) from any system equipped with a camera device. The images and/or videos can be captured for recreational use, professional photography, surveillance, and automation, among other applications. In some cases, the sequence of image frames can be processed for performing one or more functions, can be output for display, can be output for processing and/or consumption by other devices, among other uses.

Devices (e.g., mobile devices) and systems are increasingly leveraging lower-power cameras, such as "always on" (AON) cameras. Lower-power cameras continuously operate in an activated state to capture images of a scene. Lower-power cameras are useful for raising the quality of images in brightness, color, focusing, and field of view (FOV) alignment. However, since lower-power cameras are continuously operating, they consume a significant amount of power, which can significantly reduce the battery life of devices.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems and techniques for exposure control. According to some aspects, the systems and techniques provide adaptive synchronization for an automatic exposure control AEC.

According to at least one example, an apparatus for exposure control is provided. The apparatus includes at least one memory and at least one processor coupled to the at least one memory and configured to: determine a first exposure relationship between an exposure of a first image frame from a first camera of a multi-camera system and an exposure of a second image frame from a second camera of the multi-camera system, wherein the multi-camera system comprises a plurality of cameras comprising the first camera and the second camera; determine a second exposure relationship between an exposure of a third image frame from the first camera and an exposure of a fourth image frame from the second camera; determine a difference between the second exposure relationship and the first exposure relationship; and apply, based on a comparison of the difference to a threshold value, first exposure statistics of the first camera to the plurality of cameras.

In another illustrative example, a method is provided for exposure control. The method includes: determining a first exposure relationship between an exposure of a first image frame from a first camera of a multi-camera system and an exposure of a second image frame from a second camera of the multi-camera system, wherein the multi-camera system comprises a plurality of cameras comprising the first camera and the second camera; determining a second exposure relationship between an exposure of a third image frame from the first camera and an exposure of a fourth image frame from the second camera; determining a difference between the second exposure relationship and the first exposure relationship; and applying, based on a comparison of the difference to a threshold value, first exposure statistics of the first camera to the plurality of cameras.

In another illustrative example, a non-transitory computer-readable medium is provided having stored thereon instructions that, when executed by one or more processors, cause the one or more processors to: determine a first exposure relationship between an exposure of a first image frame from a first camera of a multi-camera system and an exposure of a second image frame from a second camera of the multi-camera system, wherein the multi-camera system comprises a plurality of cameras comprising the first camera and the second camera; determine a second exposure relationship between an exposure of a third image frame from the first camera and an exposure of a fourth image frame from the second camera; determine a difference between the second exposure relationship and the first exposure relationship; and apply, based on a comparison of the difference to a threshold value, first exposure statistics of the first camera to the plurality of cameras.

In another illustrative example, an apparatus is provided for exposure control. The apparatus includes: means for determining a first exposure relationship between an exposure of a first image frame from a first camera of a multi-camera system and an exposure of a second image frame from a second camera of the multi-camera system, wherein the multi-camera system comprises a plurality of cameras comprising the first camera and the second camera; means for determining a second exposure relationship between an exposure of a third image frame from the first camera and an exposure of a fourth image frame from the second camera; means for determining a difference between the second exposure relationship and the first exposure relationship; and means for applying, based on a comparison of the difference to a threshold value, first exposure statistics of the first camera to the plurality of cameras.

Aspects generally include a method, apparatus, system, computer program product, non-transitory computer-readable medium, user device, user equipment, wireless communication device, and/or processing system as substantially described with reference to and as illustrated by the drawings and specification.

In some aspects, one or more of the apparatuses described herein is, can be part of, or can include a mobile device, a smart or connected device, a camera system, and/or an extended reality (XR) device (e.g., a virtual reality (VR) device, an augmented reality (AR) device, or a mixed reality (MR) device). In some examples, the apparatuses can include or be part of a vehicle, a mobile device (e.g., a mobile telephone or so-called "smart phone" or other mobile device), a wearable device, a personal computer, a laptop computer, a tablet computer, a server computer, a robotics device or system, an aviation system, or other device. In some aspects, each apparatus can include an image sensor (e.g., a camera) or multiple image sensors (e.g., multiple cameras) for capturing one or more images. In some aspects, each apparatus can include one or more displays for displaying one or more images, notifications, and/or other displayable data. In some aspects, each apparatus includes one or more speakers, one or more light-emitting devices, and/or one or more microphones. In some aspects, each apparatus can include one or more sensors. In some cases, the one or more sensors can be used for determining a location of the apparatuses, a state of the apparatuses (e.g., a tracking state, an operating state, a temperature, a humidity level, and/or other state), and/or for other purposes.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The preceding, together with other features and embodiments, will become more apparent upon referring to the following specification, claims, and accompanying drawings.

BRIEF DESCRIPTION OF THE DRAWINGS

Illustrative aspects of the present application are described in detail below with reference to the following figures:

FIG. 4 is a table illustrating examples of power consumption for different frames rates, in accordance with some examples.

DETAILED DESCRIPTION

Figure 1:
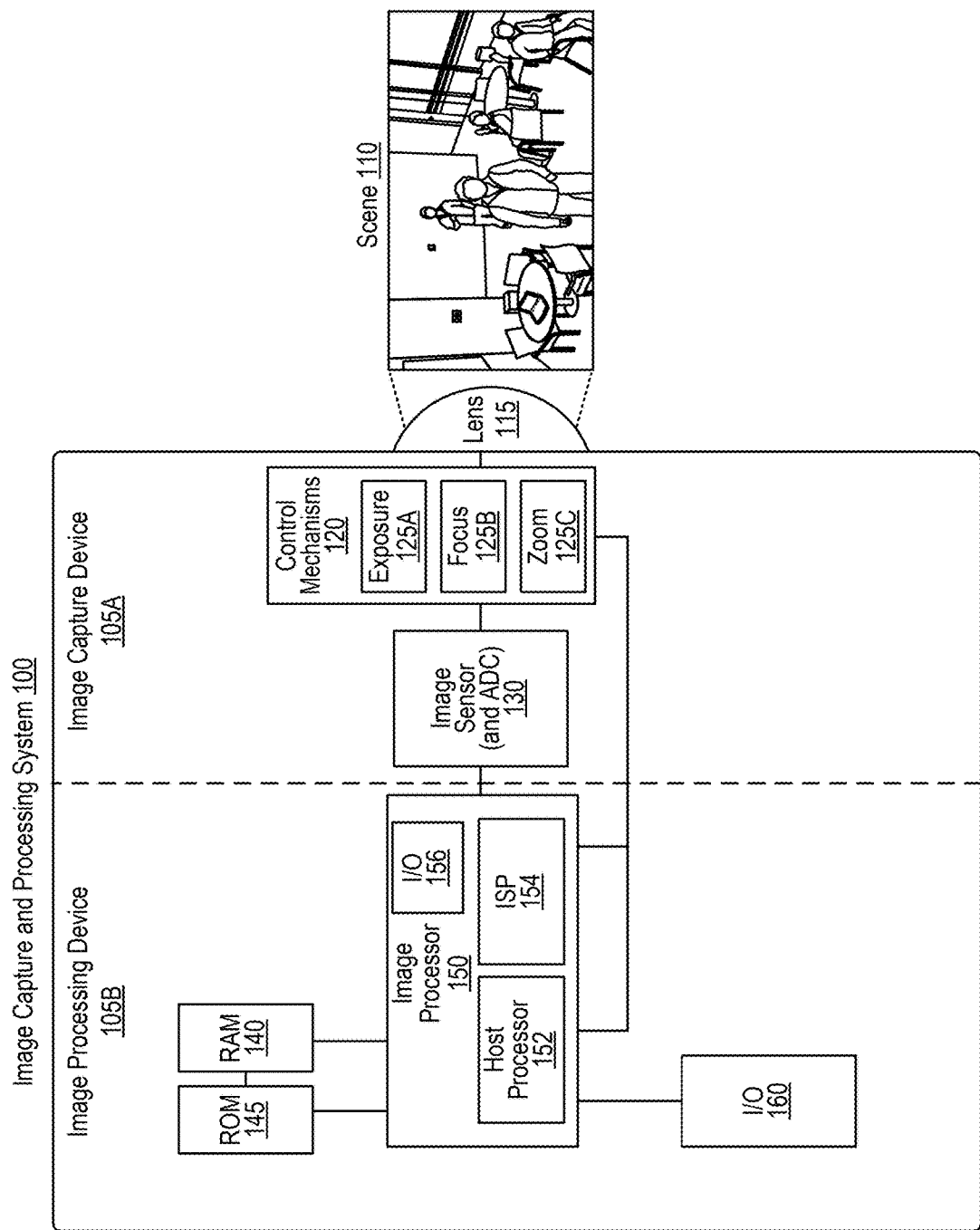
FIG. 1 is a block diagram illustrating an architecture of an image capture and processing system, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein can be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

A camera is a device that receives light and captures image frames, such as still images or video frames, using an image sensor. The terms "image," "image frame," and "frame" are used interchangeably herein. Cameras may include processors, such as image signal processors (ISPs), that can receive one or more image frames and process the one or more image frames. For example, a raw image frame captured by a camera sensor can be processed by an ISP to generate a final image. Processing by the ISP can be performed by a plurality of filters or processing blocks being applied to the captured image frame, such as denoising or noise filtering, edge enhancement, color balancing, contrast, intensity adjustment (such as darkening or lightening), tone adjustment, among others. Image processing blocks or modules may include lens/sensor noise correction, Bayer filters, de-mosaicing, color conversion, correction or enhancement/suppression of image attributes, denoising filters, sharpening filters, among others.

Cameras can be configured with a variety of image capture and image processing operations and settings. The different settings result in images with different appearances. Some camera operations are determined and applied before or during capture of the image, such as automatic exposure control (AEC) and automatic white balance (AWB) processing. Additional camera operations applied before, during, or after capture of an image include operations involving zoom (e.g., zooming in or out), ISO, aperture size, f/stop, shutter speed, and gain. Other camera operations can configure post-processing of an image, such as alterations to contrast, brightness, saturation, sharpness, levels, curves, or colors.

In some cases, a device can utilize a multi-camera synchronization (sync) system that employs a plurality of cameras. The cameras can include at least a preview camera (e.g., an ultra-wide camera or a telephoto (tele) camera) and a lower-power camera (e.g., an always-on (AON) camera, an always sensing camera (ASC), or other lower-power camera). For instance, an AON or ASC camera can leverage low power camera hardware for reduced power consumption. The terms AON and ASC are used interchangeably herein, and refer to a camera that can operate with low power settings and/or perform different or fewer image processing steps for reduced power consumption as compared to other non-AON cameras (e.g., higher power cameras, such as a preview camera). The amount of power consumed by the AON camera can depend upon the domain (also referred to herein as a settings domain) of the image and/or video frame capture. In some cases, the domain of an AON camera capturing images and/or video frames can include configuration parameters (e.g., exposure, resolution, framerate, color depth, or the like), and/or other parameters of the AON camera. In some cases, the domain can further include the processing steps (e.g., noise reduction, edge enhancement, image stabilization, color correction, or the like) performed on the captured images and/or video frames by a camera pipeline of the AON camera. In some cases, after a user initiates a video and/or image capture, a non-AON camera can capture a still image or begin capturing video frames. The non-AON camera can utilize higher power camera hardware and/or can operate with higher power settings and/or different or more image processing steps as compared to an AON or other low-power camera.

It should be understood that while specific examples of the disclosure are discussed in terms of an AON camera (or AON camera sensor) and a preview or main camera (or preview or main camera sensor), the systems and techniques described herein can be applied to many different camera or sensor configurations without departing from the scope of the present disclosure. In one illustrative example, a single camera or sensor can be configured to operate with different operating modes (e.g., a low power AON mode and a non-AON mode). References to "AON operation" herein can be understood to include capturing images and/or frames with one or more AON cameras and/or operating one or more cameras in an AON mode. In addition, non-AON cameras or sensors and/or cameras or sensors operating in a non-AON mode can sometimes be referred to as one or more "preview cameras," "preview sensors," "main cameras," or "main camera sensors". It will be understood that the systems and techniques can operate using any sequence of images or frames, such as videos, consecutively captured still images, etc.

A lower-power camera (e.g., AON or ASC camera) is useful for raising the quality of images captured by a multi-camera sync system in brightness, color, focusing, field of view (FOV) alignment, extending a zoom ratio when capturing an image, among other operations. For example, statistics from the lower-power camera can be used to determine settings for one or more other cameras of the multi-camera sync system. However, in some cases, the cameras of the multi-camera sync system may be operating at different frame rates and/or the statistics may be less relevant depending upon correspondence between FOVs of the cameras (referred to as FOV correspondence). For example, the lower-power camera may be used to determine image capture settings while operating at a lower frame rate (with lower frames per second (FPS)) than the preview camera.

A preview camera refers to a camera currently being used for previewing image frames via a display before the image frames are captured (e.g., prior to a user selecting a capture option via a user interface). The preview can change based on which camera a user has selected. For example, a camera user interface can include options for a telephoto camera, a wide-angle camera, and an ultra-wide-angle camera. The camera selected for use by the user can be designated as the preview camera.

Since the lower-power camera is always operating in an activated state continuously, regardless of the zoom ratio settings, the lower-power camera will have a significant power consumption. Reducing the frame rate (e.g., the FPS) operation of the lower-power camera is one solution for reducing the power consumption of the lower-power camera. However, a reduced FPS can lead to challenges in terms of convergence (e.g., leading to a relatively slow convergence), especially for AEC. For example, if the preview camera is configured to follow the exposure control of the lower-power camera to achieve consistent image brightness across the cameras of the multi-camera sync system, due to the lower-power camera operating at a low FPS, the response time of the lower-power camera for exposure control can be relatively slow. As such, the preview camera (in following the slow exposure control of the lower-power camera) may remain overexposed for an extended period of time when transitioning from a dark environment to a bright environment, or remain underexposed for an extended period of time when transitioning from a bright environment to a dark environment. Improved systems and techniques for a multi-camera sync system that provide a quicker response time for exposure control of an lower-power camera operating at a reduced FPS can be beneficial.

In one or more aspects, systems, apparatuses, processes (also referred to as methods), and computer-readable media (collectively referred to herein as "systems and techniques") are described herein for providing an adaptive synchronization solution for AEC. In one or more examples, the systems and techniques provide an adaptive escape and fallback solution and/or a reverse synchronization solution, which both allow for quicker response times for exposure control of a multi-camera sync system that includes an lower-power camera (e.g., an AON camera), such as an lower-power camera operating at a reduced FPS. The systems and techniques can reduce the convergence issues resulting from the low FPS operation of the lower-power camera, and can balance power savings while utilizing the lower-power camera to enhance the multi-camera sync system image quality.

In one or more aspects, the systems and techniques compare brightness information between the cameras. If the delta of (e.g., difference between) the brightness information is below or equal to a threshold, the statistics from a first camera (e.g., an lower-power camera) can continue to be used to generate capture settings for all cameras within a multi-camera sync system. Conversely, if the delta above the threshold, the statistics from one or more additional cameras (e.g., a preview camera) can be used to determine subsequent capture settings, until the delta is reduced. In this way, IQ can be maintained, while allowing for power saving camera syncing. For example, an entire FOV can be monitored without requiring all cameras to be on using an lower-power camera along with one in-use camera (e.g., a preview camera). As such, IQ is maintained, power is limited, and a smooth transition to a new camera based on lower-power camera statistics can be realized.

In one or more aspects, during operation of the systems and techniques for exposure control of a multi-camera system, one or more processors can determine, for each image frame of a plurality of image frames, an exposure relationship between an exposure of a first camera of the multi-camera system and an exposure of a second camera of the multi-camera system. For instance, the exposure relationship can include an exposure ratio of the exposure of the first camera over the exposure of the second camera for each image frame of the plurality of image frames. In one or more examples, the multi-camera system includes a plurality of cameras, which can include the first camera and the second camera. The one or more processors can determine a difference (e.g., a difference or delta of the exposure ratio based on the difference, which may be referred to herein as a delta ratio or a delta of the ratio) between a first exposure relationship (e.g., a first exposure ratio) of a current image frame of the plurality of image frames and a second exposure relationship (e.g., a second exposure ratio) of a previous image frame of the plurality of image frames. The one or more processors can then compare difference (or the delta ratio) to a threshold value. In one example, based on the difference (or delta ratio) being less than (or in some cases equal to) the threshold value, the one or more processors can apply exposure statistics of the second camera to the plurality of cameras of the multi-camera system. In another example, based on the difference (or delta ratio) being greater than the threshold value, the one or more processors can apply exposure statistics of the first camera to the plurality of cameras of the multi-camera system. In some cases, the one or more processors can apply exposure statistics of the second camera to the plurality of cameras of the multi-camera system based on a difference (e.g., delta ratio) between two subsequent image frames (occurring after the current frame and the subsequent frame in the plurality of image frames) being less than (or equal to in some cases) the threshold value for a certain duration of time after applying the exposure settings of the first camera.

In one or more examples, the difference is further based on an absolute value of the difference of the exposure relationship (e.g., the exposure ratio) of the current image frame of the plurality of image frames and the exposure relationship (e.g., exposure ratio) of the previous image frame of the plurality of image frames. In one or more examples, the first camera is a preview camera. In some examples, the preview camera is a telephoto (tele) camera. In one or more examples, the second camera is an lower-power camera. In some examples, the lower-power camera is an always-on (AON) camera.

In some examples, the second camera is operating at a lower frames per second (FPS) than the first camera. In one or more examples, the second camera has a different field of view (FOV) than the first camera.

Additional aspects of the present disclosure are described in more detail below.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by the image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors (e.g., image sensor 130) may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1910 discussed with respect to the computing system 1900. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using a MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1925, read-only memory (ROM) 145/1920, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1935, any other input devices 1945, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral devices and/or transmit data to the one or more peripheral devices. The I/O 160 may include one or more wireless transceivers that enable a wireless connection between the system 100 and one or more peripheral devices, over which the system 100 may receive data from the one or more peripheral devices and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
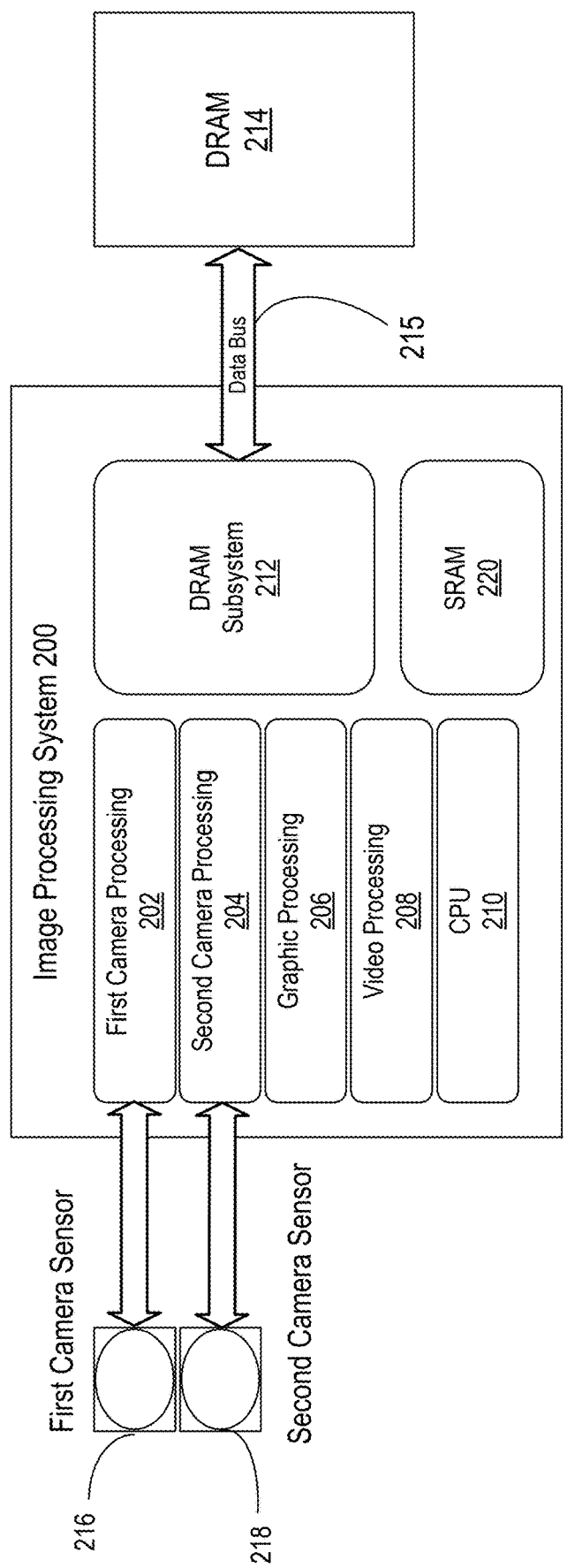
FIG. 2 is a block diagram illustrating an example image processing system, in accordance with some examples.

FIG. 2 illustrates an example block diagram of an image processing system 200. In some cases, the image processing system 200 can include, or can be included in, an image capture and processing system 100, an image capture device 105A, an image processing device 105B, portions thereof, or any combination thereof. In the illustrative example of FIG. 2, the image processing system 200 includes a first camera processing subsystem 202 (e.g., an lower-power camera processing subsystem, such as an AON camera processing subsystem), a second camera processing subsystem 204 (e.g., a main camera processing subsystem), a graphic processing subsystem 206, a video processing subsystem 208, a central processing unit (CPU) 210, a DRAM subsystem 212, and an SRAM 220.

In some implementations, the first camera processing subsystem 202 can receive inputs from a first camera sensor 216 (e.g., an lower-power camera sensor, such as an AON camera sensor), and the second camera processing subsystem 204 can receive inputs from a second camera sensor 218 (e.g., a main camera sensor). The first camera sensor 216 and the second camera sensor 218 can include any image and/or video sensors or capturing devices. In some cases, the first camera sensor 216 and the second camera sensor 218 can be part of a multiple-camera assembly, such as a dual-camera assembly or a multi-camera sync system. In some examples, the first camera sensor 216 and the second camera sensor 218 may include an image capture and processing system 100, an image capture device 105A, an image processing device 105B, or a combination thereof. In some implementations, the first camera processing subsystem 202 of the image processing system 200 can communicate with the first camera sensor 216 to send and/or receive operational parameters to/from the first camera sensor 216. Similarly, in some implementations, the second camera processing subsystem 204 of the image processing system 200 can communicate with the second camera sensor 218 to send and/or receive operational parameters to/from the second camera sensor 218. The DRAM subsystem 212 of the image processing system 200 can communicate with DRAM 214 over a data bus 215. For example, the DRAM subsystem 212 can send video frames to and/or retrieve video frames from the DRAM 214. In some implementations, the image processing system 200 can include a local SRAM 220.

In some cases, the first camera sensor 216 can include optimizations for reducing power consumption. In some cases, the first camera processing subsystem 202 can be configured to store data (e.g., video frame data) in SRAM 220 located within the image processing system 200. In some cases, storing data in SRAM 220 can conserve power by reducing the power required to drive data and address lines when compared to driving signals over the data bus 215 to communicate with DRAM 214. In some implementations, island voltage rails can be used to power the first camera sensor 216 and the first camera processing subsystem 202. In some cases, using island rails can conserve power by preventing inactive components of the image processing system 200 from drawing power. In some examples, the first camera sensor 216 can be clocked with a low power clock source such as one or more ring oscillators. In some implementations, the image and/or video captured by the first camera sensor 216 can be associated with a different domain from the images and/or video captured by the second camera sensor 218. As described above, a domain can include, without limitation, characteristics or parameters of the frames captured by a camera sensor such as resolution, color depth, and/or framerate. In one illustrative example, the first camera sensor 216 can capture images with a lower resolution than the second camera sensor 218. In some cases, capturing lower resolution frames with the first camera sensor 216 can save power by reducing the amount of data (e.g., pixel data) that needs to be read out from the first camera sensor 216. In some implementations, the first camera processing subsystem 202 can perform similar processing steps to the second camera processing subsystem 204 on fewer pixels, resulting in fewer calculations and thereby reducing power consumption.

In some cases, a domain can include a set of image processing steps (e.g., noise reduction, edge enhancement, image stabilization, color correction) performed on images or video frames captured by a camera sensor. In some implementations, video frames captured by the first camera sensor 216 and the second camera sensor 218 can be processed with different image processing steps. For example, the first camera processing subsystem 202 can perform fewer and/or different processing steps than the second camera processing subsystem 204. In some cases, performing fewer and/or different processing operations with the first camera processing subsystem 202 during always active (e.g., always on) operation can conserve power.

In another example, the first camera sensor 216 can capture monochrome video frames while second camera sensor 218 can capture red, green, blue (RGB) color video frames. In some cases, reading out and processing monochrome video frames can consume less power than reading out and processing RGB color video frames. In some cases, the video frames captured by the first camera sensor 216 and the second camera sensor 218 can be based on data captured from different portions of the light spectrum such as visible, ultra-violet (UV), near infrared (NIR), short wave infrared (SWIR), other portions of the light spectrum, or any combination thereof.

In the illustration of FIG. 2, the first camera sensor 216 and the second camera sensor 218 can each provide frames to a different camera processing subsystem. However, in some cases, a single camera processing subsystem can process frames from the first camera sensor 216 and the second camera sensor 218 without departing from the scope of the present disclosure. Furthermore, although the first camera sensor 216 and the second camera sensor 218 are shown as two different sensors, one or more camera sensors that can operate in two or more different modes (e.g., an always active mode (e.g., an always on mode), a medium power mode, a high power mode, or the like) can also be used without departing from the scope of the present disclosure.

As previously mentioned, a multi-camera sync system uses a sensor technology that can obtain continuous sensor information for capturing all aspects of lighting within the scene for raising the image quality (IQ). This sensor technology can be particularly useful in challenging lighting conditions, such as landscapes under bright sunlight or interior shots with mixed lighting scenes. This sensor technology allows for the faintest glimmer of light to the deepest shadow within a scene to be captured within an image. Thus, the captured image can have a high dynamic range (DR) and be able to communicate the full spectrum of light and shapes within a scene as perceived in the real world.

A multi-camera sync system utilizes a plurality of cameras including a preview camera (e.g., in the form of an ultra-wide camera or a telephoto (tele) camera) and an lower-power camera (e.g., in the form of an always-on (AON) camera). The lower-power camera is useful for raising the quality of images captured by the multi-camera sync system in brightness, color, focusing, and field of view (FOV) alignment. For example, the statistics from the lower-power camera may be used to determine operational settings for one or more of the plurality of cameras of the multi-camera sync system.

Figure 3:
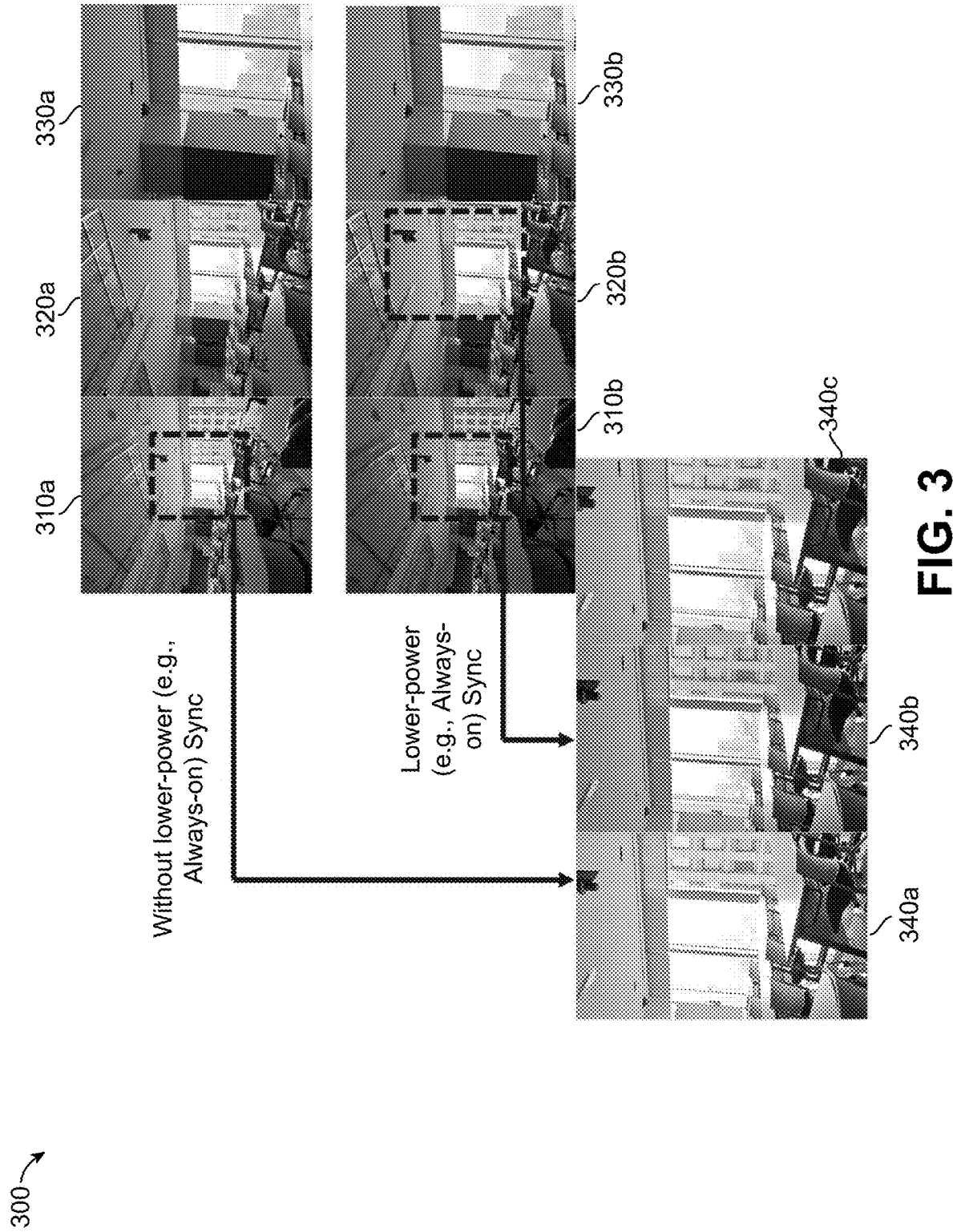
FIG. 3 is a diagram illustrating examples of image frames captured by different cameras within a multi-camera sync system, in accordance with some examples.

FIG. 3 shows examples of image frames captured by a multi-camera sync system. In particular, FIG. 3 is a diagram illustrating examples 300 of image frames 310a, 310b, 320a, 320b, 330a, 330b captured by different cameras within a multi-camera sync system. In FIG. 3, the images 310a, 310b may be captured by an ultra-wide (e.g., ultra-wide FOV) camera, the images 320a, 320b may be captured by a wide camera (e.g., a wide FOV) camera, and images 330a, 330b may be captured by a tele camera (e.g., with a small FOV).

In one or more examples, based on a zoom ratio, the ultra-wide camera or the tele camera may operate as a preview camera. For example, when the zoom ratio is 3× or 5× (e.g., for zooming in on the scene), the tele camera may operate as the preview camera. Conversely, for example, when the zoom ratio is 0.5× (e.g., for zooming out of the scene), the ultra-wide camera may operate as the preview camera.

In some examples, the wide camera may operate as an lower-power camera, which may be continuously operating to capture images and may be in the form of an AON camera. When the multi-camera sync system is operating with synchronization, statistics (e.g., exposure statistics) of the lower-power camera (e.g., the wide camera) may be applied to the other cameras (e.g., the ultra-wide camera and/or the tele camera) to determine operational settings (e.g., exposure settings) for the other cameras (e.g., the ultra-wide camera and/or the tele camera) to raise the image quality of images captured by the multi-camera sync system in brightness, color, focusing, and FOV alignment. Conversely, when the system is not operating with synchronization, the cameras (e.g., the ultra-wide camera and/or the tele camera) can simply use their own respective statistics to determine their operational settings.

The images 310a, 320a, 330a are captured by the system when operating without synchronization (e.g., the ultra-wide camera and the tele camera using their own statistics). Image 340a shows details of the view contained within a dashed box depicted on image 310a. As shown in FIG. 3, the image 340a is overexposed and, as such, the buildings located outside of the window cannot be seen in the image 340a.

The images 310b, 320b, 330b are captured by the system when operating with synchronization (e.g., the ultra-wide camera and the tele camera are applying the statistics from the lower-power camera). Image 340b shows details of the view contained within a dashed box depicted on image 310b, and image 340c shows details of the view contained within a dashed box depicted on image 320b. As shown in FIG. 3, the images 340b, 340c are exposed appropriately such that the buildings located outside of the window can be viewed in the images 340b, 340c.

However, since the lower-power camera is always operating in an activated state continuously, regardless of the zoom ratio settings, the lower-power camera will consume a significant amount of power. Currently, a popular solution for reducing the power consumption of an lower-power camera is to reduce the frames per second (FPS) operation of the lower-power camera.

FIG. 4 is a table 400 illustrating examples of power consumption for different frames rates. In FIG. 4, the table 400 is shown to include a FPS 410 column, a normal power consumption in milliwatts (mW) 420 column, a multi-camera sync system with deep sleep power consumption in mW 430 column, and a multi-camera sync system over normal ratio 440 column. For example, as shown in the table 400, from a FPS of 15 to a reduced FPS of 5, the normal power consumption can be significantly lowered from 241.8 mW to 141.5 mW.

However, a reduced FPS can lead to challenges in terms of convergence (e.g., resulting in a relatively slow convergence), especially for the AEC. For example, if the preview camera is configured to follow the exposure control of the lower-power camera to achieve consistent image brightness across the cameras of the multi-camera sync system, since the lower-power camera is operating at a low FPS, the response time of the lower-power camera for exposure control can be relatively slow. As such, the preview camera (in following the slow exposure control of the lower-power camera) can remain overexposed for an extended period of time when transitioning from a dark environment to a bright environment, or remain underexposed for an extended period of time when transitioning from a bright environment to a dark environment.

Figure 5:
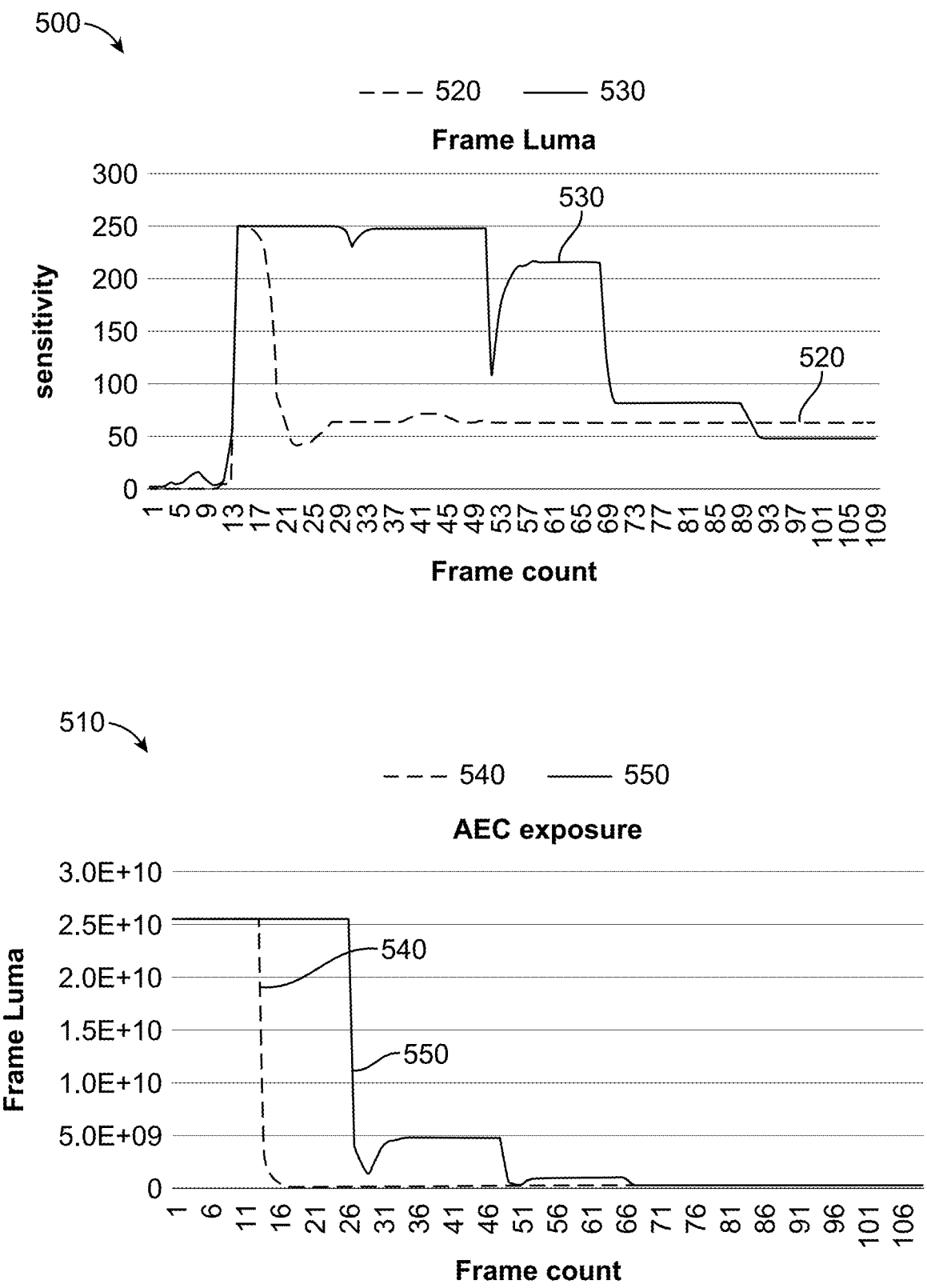
FIG. 5 are graphs illustrating examples of sensitivity of exposure control and frame luma, respectively, for cameras operating with different frame rates, in accordance with some examples.

FIG. 5 are graphs 500, 510 illustrating examples of sensitivity of exposure control and frame luma, respectively, for cameras operating with different frame rates. In FIG. 5, for graph 500, the x-axis represents image frame count (e.g., over time), and the y-axis represents sensitivity of exposure control for the cameras. In the graph 500, a sensitivity curve 520 is plotted for a preview camera (e.g., a tele camera) operating at 30 FPS, and a sensitivity curve 530 is plotted for an lower-power camera (e.g., a wide camera in the form of an AON camera) operating at a reduced frame rate of 5 FPS. As shown in the graph 500, after the cameras have each been covered with a camera cover and the cover has been removed (e.g., from a dark lighting condition to a bright lighting condition), the sensitivity curve 520 of the preview camera operating at 30 FPS is shown to converge to normal brightness much more quickly than the sensitivity curve 530 of the lower-power camera operating at 5 FPS. For example, the sensitivity curve 520 of the preview camera operating at 30 FPS is shown to converge to normal brightness at frame 21, while the sensitivity curve 530 of the lower-power camera operating at 5 FPS is shown to converge to normal brightness at frame 69.

In FIG. 5, for graph 510, the x-axis represents image frame count (e.g., over time), and the y-axis represents frame luma. In the graph 510, a frame luma curve 540 is plotted for the preview camera (e.g., a tele camera) operating at 30 FPS, and a frame luma curve 550 is plotted for the lower-power camera (e.g., a wide camera in the form of an AON camera) operating at a reduced frame rate of 5 FPS. As shown in the graph 510, after the cameras have each been covered with a camera cover and the cover has been removed (e.g., from a dark lighting condition to a bright lighting condition), the frame luma curve 540 of the preview camera operating at 30 FPS is shown to converge to normal brightness much more quickly than the frame luma curve 550 of the lower-power camera operating at 5 FPS. For example, the frame luma curve 540 of the preview camera operating at 30 FPS is shown to converge to normal brightness at frame 16, while the frame luma curve 550 of the lower-power camera operating at 5 FPS is shown to converge to normal brightness at frame 51.

Figure 6:
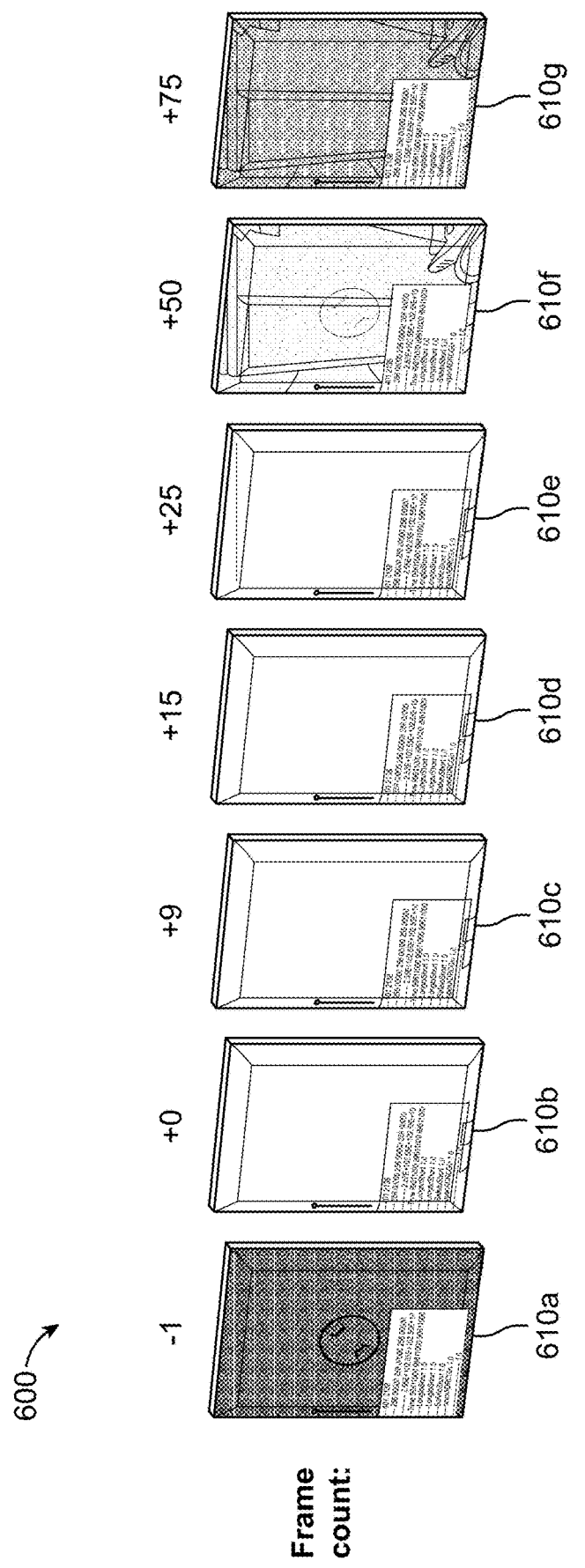
FIG. 6 is diagram illustrating example image frames of a preview camera, following the slow exposure control of an lower-power camera, remaining overexposed for an extended period of time when transitioning from a dark environment to a bright environment, in accordance with some examples.

FIG. 6 is diagram 600 illustrating example image frames 610a, 610b, 610c, 610d, 610e, 610f, 610g of a preview camera, following the slow exposure control of an lower-power camera, remaining overexposed for an extended period of time when transitioning from a dark environment to a bright environment. In FIG. 6, at frame −1, both the preview camera and the lower-power camera are covered with their respective camera covers and, as such, the image frame 610a at frame −1 is shown to be dark. At frame 0, the camera covers have been removed from both of the cameras and, as such, the image frame 610b at frame 0 is shown to be overexposed. In FIG. 6, the image frames 610b, 610c, 610d, 610e, 610f from frames 0 to 50 are shown to remain overexposed. The image frame 610g shows that the preview camera does not converge to normal brightness until frame 75.

Therefore, improved systems and techniques for a multi-camera sync system that provide a quicker response time for exposure control of an lower-power camera operating at a reduced FPS can be useful.

In one or more aspects, the systems and techniques provide an adaptive synchronization for an AEC always-on low FPS sync solution. In one or more examples, the systems and techniques provide an adaptive escape and fallback solution. In some cases, the systems and techniques provide a reverse synchronization solution. Both solutions can allow for a quicker response time for exposure control of an lower-power camera (e.g., an AON camera) within a multi-camera sync system, such as an lower-power camera operating at a reduced FPS. In one or more examples, the systems and techniques can reduce the convergence issues resulting from the low FPS operation of the lower-power camera, and can balance power savings while utilizing the lower-power camera to enhance the multi-camera sync system image quality.

In one or more aspects, for the adaptive escape and fallback, one or more processors of a multi-camera sync system can calculate an exposure relationship (e.g., an exposure ratio of 50/50=1) between an lower-power camera (e.g., an AON camera) and a preview camera for each frame (e.g., for frame 1, 2, 3, 4, 5, . . . ) as they are captured in time. As the frames are captured in time, the one or more processors can continuously monitor the frame-by-frame delta of this ratio. For example, the one or more processors can determine the difference between the exposure relationships (e.g., the delta of the exposure ratios) between each of the image frames (e.g., between frame 1 and frame 2, between frame 2 and frame 3, between frame 3 and frame 4, etc.) from the different cameras. If the scene suddenly changes (e.g., changes in brightness), an increase (e.g., a pulse) will appear in the difference. If the difference exceeds a certain threshold (e.g., is greater than a threshold value, such as greater than a value of 0), the one or more processors can determine that there has been a scene change (e.g., a change in brightness in the scene). When there is a scene change, the preview camera can operate in a free-run mode (e.g., without synchronization with the lower-power camera to obtain its own statistics) or reduce its synchronization percentage with the lower-power camera (e.g., to reduce the percentage of statistics from the lower-power camera that the preview camera uses). When the scene stabilizes again (e.g., the brightness of the scene normalizes), the difference will approach zero. If the difference remains at or below the threshold (e.g., less than or equal to the threshold value, such as a value of 0) for a certain duration of time (e.g., for at least five frames), the one or more processors can determine that the scene has stabilized (e.g., the brightness of the scene has stabilized or converged). The one or more processors can then increase the preview camera's synchronization percentage with the lower-power camera (e.g., to increase the percentage of statistics from the lower-power camera that the preview camera uses).

Figure 7:
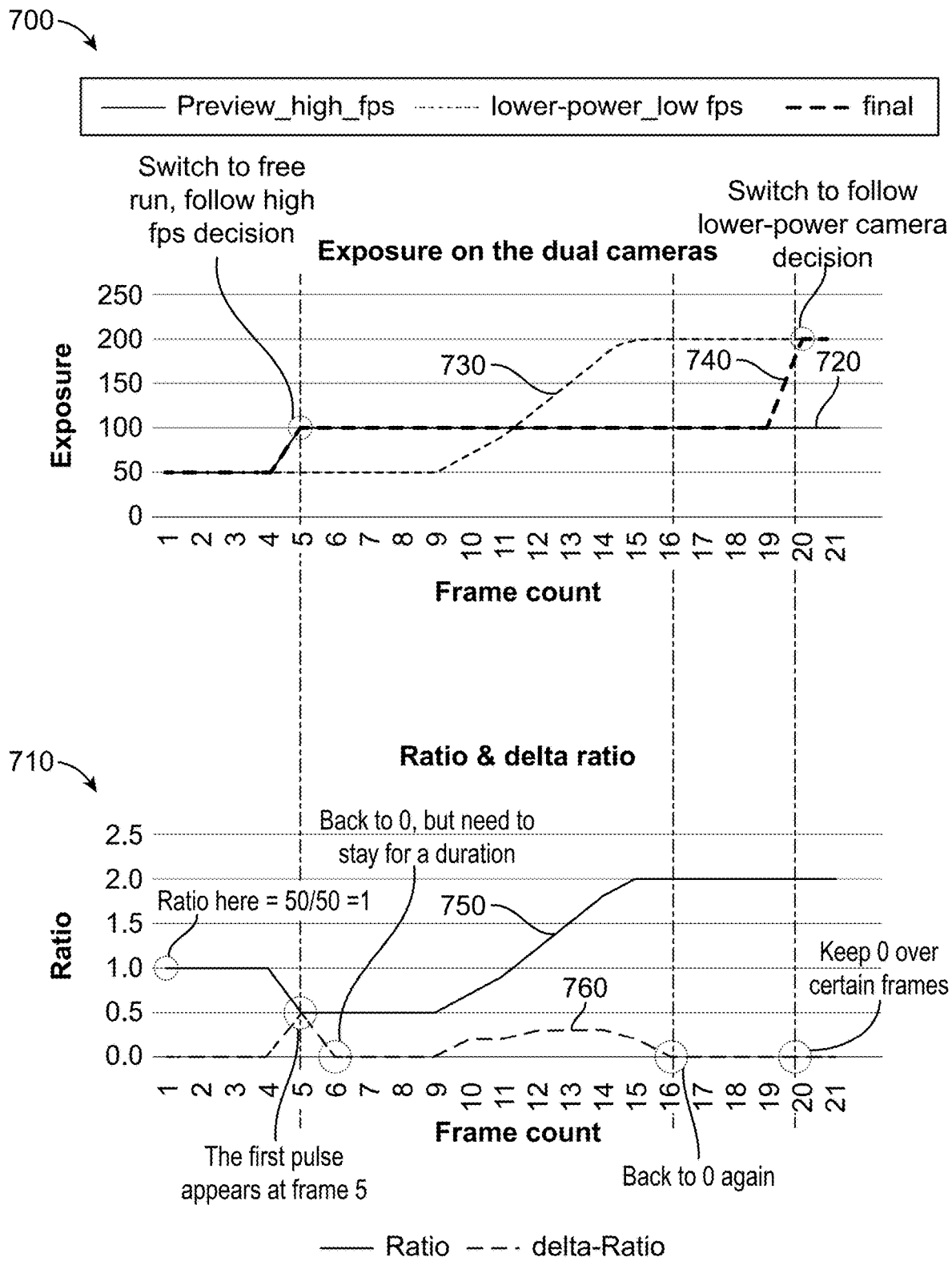
FIG. 7 are graphs illustrating an example of adaptive escape and fallback, in accordance with some examples.

FIG. 7 are graphs 700, 710 illustrating an example of adaptive escape and fallback solution. In FIG. 7, in graph 700, the x-axis represents image frame count (e.g., over time), and the y-axis represents exposure. In graph 710, the x-axis represents image frame count (e.g., over time), and the y-axis represents exposure ratio. In FIG. 7, the two graphs 700, 710 show, when there is a scene change (e.g., a change in brightness), how a preview camera can escape from using statistics from an lower-power camera, and after the scene has stabilized (e.g., the brightness has converged to normal brightness) after a certain period of time, the preview camera can fallback to using statistics from the lower-power camera.

In graph 700 of FIG. 7, an exposure curve 720 of the preview camera and an exposure curve 730 of the lower-power camera are shown. The exposure curve 720 of the preview camera shows that when the preview camera is observing a scene that changes from a bright environment to a dark environment (e.g., at frame 5), the exposure of the preview camera will be boosted relatively quickly (e.g., because the preview camera is operating at a high FPS, such as 30 FPS). The exposure curve 730 of the lower-power camera shows that when the lower-power camera is observing a scene that changes from a bright environment to a dark environment (e.g., at frame 5), the lower-power camera will respond relatively slowly (e.g., because the lower-power camera is operating at a low FPS, such as 5 FPS) to raise the exposure (e.g., at frame 9). As such, the preview camera will raise its exposure first (e.g., at frame 5) and, later, the lower-power camera will raise its exposure (e.g., at frame 9).

In order to have the final convergence of the cameras be faster, the exposure behavior can be modified to follow the exposure curve 740. For example, the preview camera can follow the lower-power camera (e.g., use the statistics of the lower-power camera) up until the scene changes (e.g., in brightness) at frame 5. The preview camera can then (e.g., at frame 5) escape from following the lower-power camera (e.g., the preview camera can use its own statistics). After the scene has stabilized (e.g., the brightness has converged to a normal brightness) after a certain period of time, the preview camera can fallback (e.g., at frame 20) to following the lower-power camera (e.g., go back to using the statistics of the lower-power camera).

In one or more examples, the graph 710 illustrates a method that may be used to determine the exposure curve 740 of FIG. 7. In graph 710, an exposure ratio curve 750 and a delta ratio curve 760 are shown. The exposure ratio illustrated by the exposure ratio curve 750 is an example of an exposure relationship between image frames from two different cameras (e.g., a preview camera and a lower-power camera) of a multi-camera system. The delta ratio illustrated by the delta ratio curve 760 indicates a difference between exposure ratios of two image frames (having a same frame count) from the two cameras. During operation of the multi-camera sync system for adaptive escape and fallback, an exposure ratio between the two cameras (e.g., the preview camera and the lower-power camera) may be calculated frame-by-frame. For example, at frame 0, the exposure ratio for the two cameras is shown to be 50/50, which is equal to one (1).

At frame 5, the scene changes and, as such, the preview camera raises its exposure (e.g., as shown in graph 700). As such, at frame 5 on graph 710, the exposure ratio of the two cameras has dropped to 0.5 as shown by the exposure ratio curve 750. Thus, the delta ratio curve 760 shows a pulse at frame 5 on graph 710. When the delta ratio is above a threshold, the preview camera can escape from following the lower-power camera (e.g., the preview camera can use its own statistics), as shown in the exposure curve 740 at frame 5 of graph 700. At frame 6 of the delta ratio curve 760 on graph 710, the delta ratio will return back to zero (0). After the scene has stabilized (e.g., the brightness has converged to normal brightness) after a certain period of time (e.g., as shown from frames 16 to 20 of the delta ratio curve 760), the preview camera can fallback (e.g., at frame 20) to following the lower-power camera (e.g., go back to using the statistics of the lower-power camera).

Figure 8:
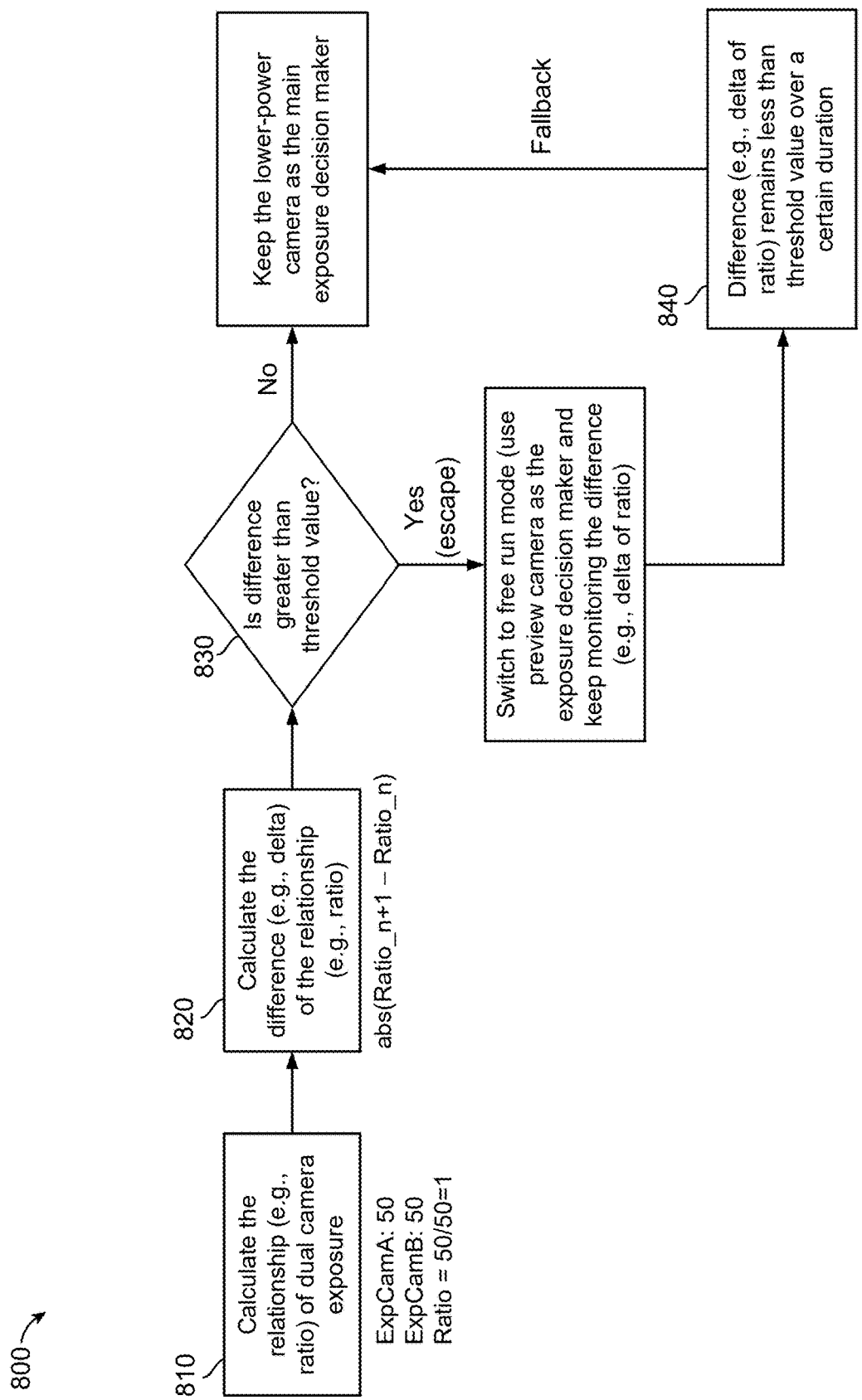
FIG. 8 is a flowchart illustrating an example process for adaptive escape and fallback, in accordance with some examples.

FIG. 8 is a flowchart illustrating an example process 800 for adaptive escape and fallback. In one or more examples, during operation of the systems and techniques for exposure control of a multi-camera system utilizing adaptive escape and fallback, at block 810, one or more processors (e.g., image processor 150 of FIG. 1; first camera processing subsystem 202, second camera processing subsystem 204, and/or CPU 210 of FIG. 2; and/or processor 1510 of FIG. 15) can determine an exposure relationship (e.g., an exposure ratio) of an exposure of a first camera (e.g., a preview camera, which may be an ultra-wide camera or a tele camera) over an exposure of a second camera (e.g., an lower-power camera, such as an AON camera) for each image frame of a plurality of image frames (e.g., frame 1, frame 2, frame 3, . . . ). In some cases, the multi-camera system includes a plurality of cameras, which can include the first camera and the second camera. For instance, the exposure of the first camera can include a value of 50 when capturing a first image frame and the exposure of the second camera can include a value of 50 when capturing second image frame at a same time (and thus with a same frame count) as the first image frame, in which case the exposure ratio will have a value of 1

$$\left(\text{denoted as } \frac{50}{50} = 1\right).$$

In one illustrative example with reference to FIG. 7, a first exposure relationship between frame 4 from the preview camera and frame 4 from the lower-power camera is such that the exposure values are the same (both have an exposure value of 50, in which case an exposure ratio between the exposure value of frame 4 from the preview camera and the exposure value of frame 4 from the lower-power camera is equal to 1). A second exposure relationship between frame 5 from the preview camera and frame 5 from the lower-power camera is such that the exposure values are different (the exposure value of frame 5 from the preview camera is equal to 100 and the exposure value of frame 5 from the lower-power camera is equal to 50, in which case an exposure ratio between the exposure value of frame 5 from the preview camera and the exposure value of frame 5 from the lower-power camera is equal to 0.5 (⁵⁰⁄₁₀₀)). In one or more examples, the second camera (e.g., the lower-power camera) is operating at a lower frames per second (FPS) than the first camera (e.g., the preview camera). In some examples, the second camera has a different field of view (FOV) than the first camera.

At block 820, the one or more processors can determine a difference (e.g., a delta ratio) based on a difference of the relationship (e.g., exposure ratio) of a current image frame of the plurality of image frames and the relationship (e.g., exposure ratio) of a previous image frame of the plurality of image frames. For instance, using the example from above with reference to FIG. 7, the one or more processors can determine a difference between the first exposure relationship (between frame 4 from the preview camera and frame 4 from the lower-power camera) and the second exposure relationship (between frame 5 from the preview camera and frame 5 from the lower-power camera). Referring to FIG. 7, difference between the first and second exposure relationships (corresponding to frames 4 and 5) includes a value of 0.5 (1−0.5). In one or more examples, the difference may be further based on an absolute value of the difference of the exposure relationship (e.g., exposure ratio) of the current image frame (e.g., frame n+1) of the plurality of image frames and the exposure relationship (e.g., exposure ratio) of the previous image frame (e.g., frame n) of the plurality of image frames (e.g., delta ratio=abs(Ratio$_{n+1}$−Ratio$_n$)).

At block 830, the one or more processors can then compare the difference to a threshold value (e.g., a predetermined threshold value, such as a value of 0.5). In one or more examples, the one or more processors can apply, to the plurality of cameras of the multi-camera system (e.g., to the first camera, which may be the preview camera), exposure statistics of the second camera (e.g., the lower-power camera), based on the difference being less than or equal to the threshold value. For example, the first camera (e.g., the preview camera) can be kept in a synchronization mode, where the first camera (e.g., the preview camera) follows the second camera (e.g., the lower-power camera). In the synchronization mode, the second camera (e.g., the lower-power camera) operates as the main exposure decision maker for the first camera (e.g., the preview camera) and, as such, the first camera (e.g., the preview camera) uses the statistics from the second camera (e.g., the lower-power camera).

Conversely, the one or more processors can apply, to the plurality of cameras of the multi-camera system (e.g., to the first camera, which may be the preview camera), exposure statistics of the first camera (e.g., the preview camera), based on the difference being greater than the threshold value. For example, the first camera (e.g., preview camera) can switch from a synchronization mode to a free run mode. In the free run mode, the first camera (e.g., preview camera) operates as the exposure decision maker for itself and, as such, the first camera (e.g., the preview camera) uses its own statistics. The one or more processors can continue to monitor the difference between subsequent pairs of adjacent image frames (frames having a same frame count) from the different cameras.

At block 840, the one or more processors can then apply, to the plurality of cameras of the multi-camera system (e.g., to the first camera, which may be the preview camera), exposure statistics of the second camera (e.g., the lower-power camera) based on the difference being less than or equal to the threshold value for a certain duration of time (e.g., at least five image frames) after applying the exposure settings of the first camera. For example, the first camera (e.g., preview camera) can fall back to the free run mode. In the free run mode, the first camera (e.g., preview camera) operates as the exposure decision maker for itself and, thus, the first camera (e.g., the preview camera) uses its own statistics.

Figure 9:
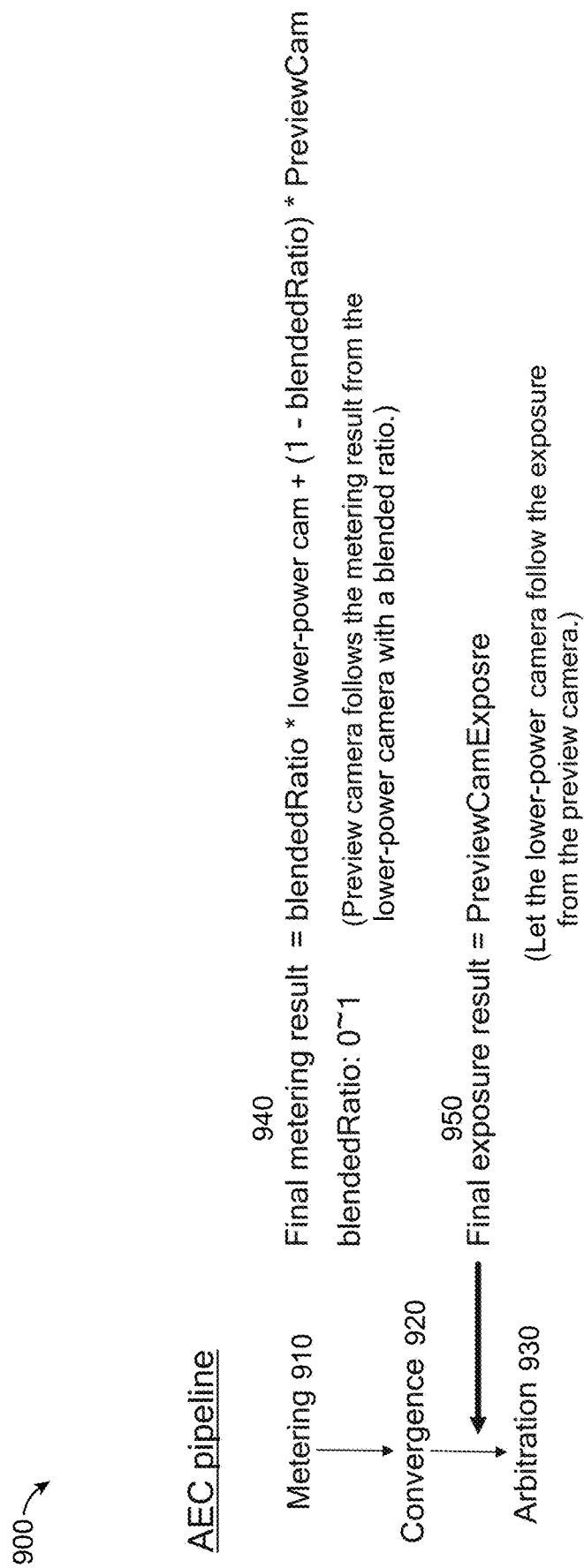
FIG. 9 is a diagram illustrating an example of an automatic exposure control (AEC) pipeline illustrating reverse synchronization, in accordance with some examples.

FIG. 9 is a diagram illustrating an example of an automatic exposure control (AEC) pipeline 900, which may be employed for reverse synchronization. Reverse synchronization between an lower-power camera (e.g., an AON camera) and a preview camera can further speed up the convergence on the low FPS lower-power camera when the scene is changing.

In FIG. 9, the AEC pipeline 900 is shown to include metering 910, convergence 920, and arbitration 930 portions. At the beginning of the pipeline 900, for metering 910, an exposure decision can be determined by one or more processors. The final metering result 940 can be determined by the following formula:

$$\text{Final metering result} = \text{blendedRatio} * \text{Always-onCam} + (1 - \text{blendedRatio}) * \text{PreviewCam}$$

where the blendedRatio can be equal to the exposure relationship (e.g., exposure ratio) of an exposure of a first camera (e.g., a preview camera, which may be an ultra-wide camera or a tele camera) over an exposure of a second camera (e.g., an lower-power camera, such as an AON camera). The blendedRatio may be a value within a range of zero (0) to one (1). For example, the blendedRatio is a factor that controls the current exposure for the entire camera system, which may be based on statistics from the first camera or the second camera. For example, referring to FIG. 7, the blendedRatio may start at 1.0, then drop to 0 at frame 5, may stay at 0 until frame 19, and then may return to 1.0 at frame 20. When the blendedRatio is equal to one, a first camera (e.g., a preview camera) can follow the metering results (e.g., statistics) from a second camera (e.g., an lower-power camera). Conversely, when the blendedRatio is equal to zero, the first camera (e.g., a preview camera) can follow the metering results (e.g., statistics) from itself (e.g., the first camera). For convergence 920 in the AEC pipeline 900, an amount of time for the convergence of the exposure can be determined. For arbitration 930 of the AEC pipeline 900, a final exposure result 950 can be determined by the one or more processors. The first camera (e.g., the preview camera) exposure (e.g., PreviewCamExposure) can be used for the final exposure result 950. As such, the second camera (e.g., lower-power camera) can follow the exposure (e.g., use the statistics) from the first camera (e.g., preview camera).

Figure 10:
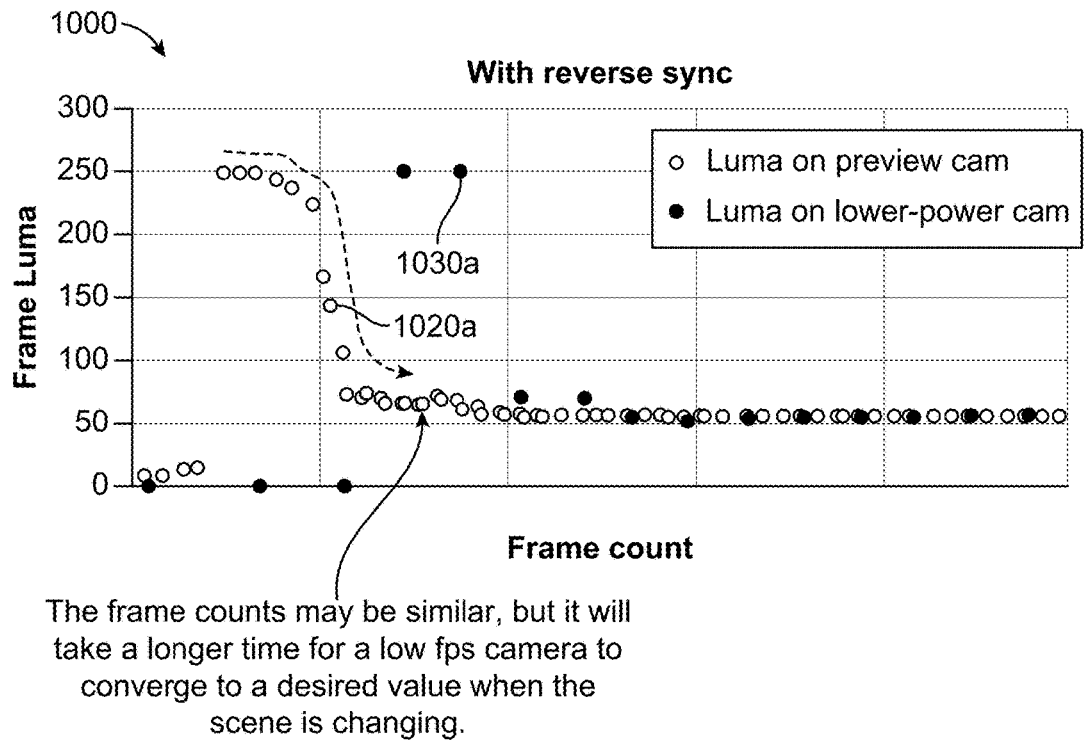
FIGS. 10, 11, and 12 are graphs illustrating examples of frame luma for cameras operating with reverse synchronization and without reverse synchronization, in accordance with some examples.
Figure 10:
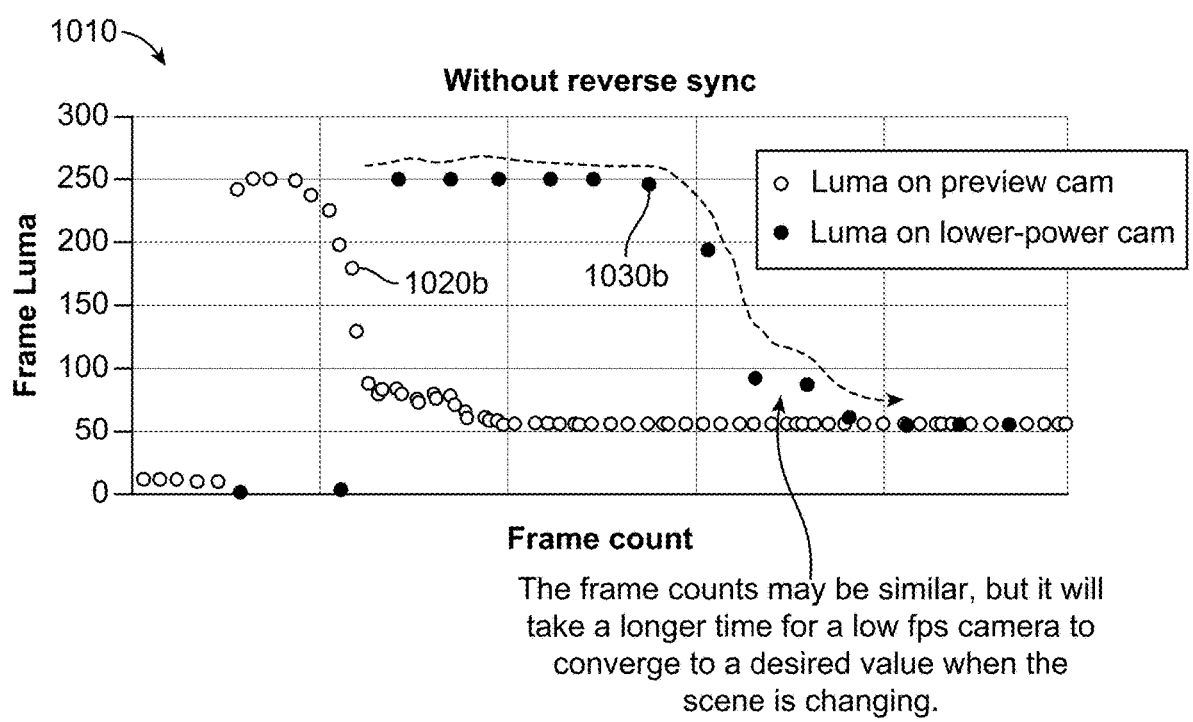
Figure 11:
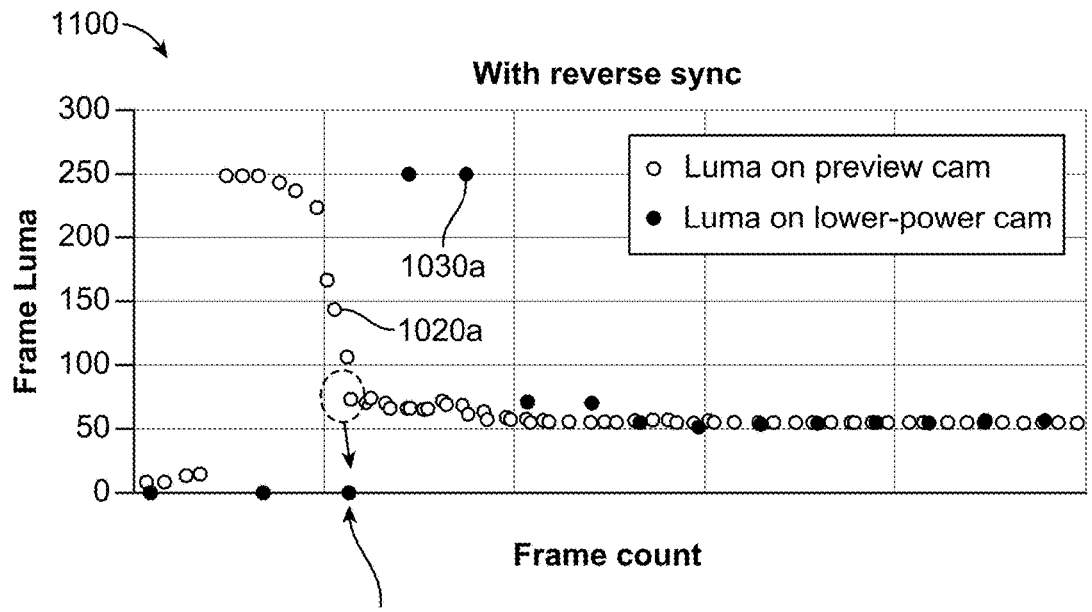
Figure 11:
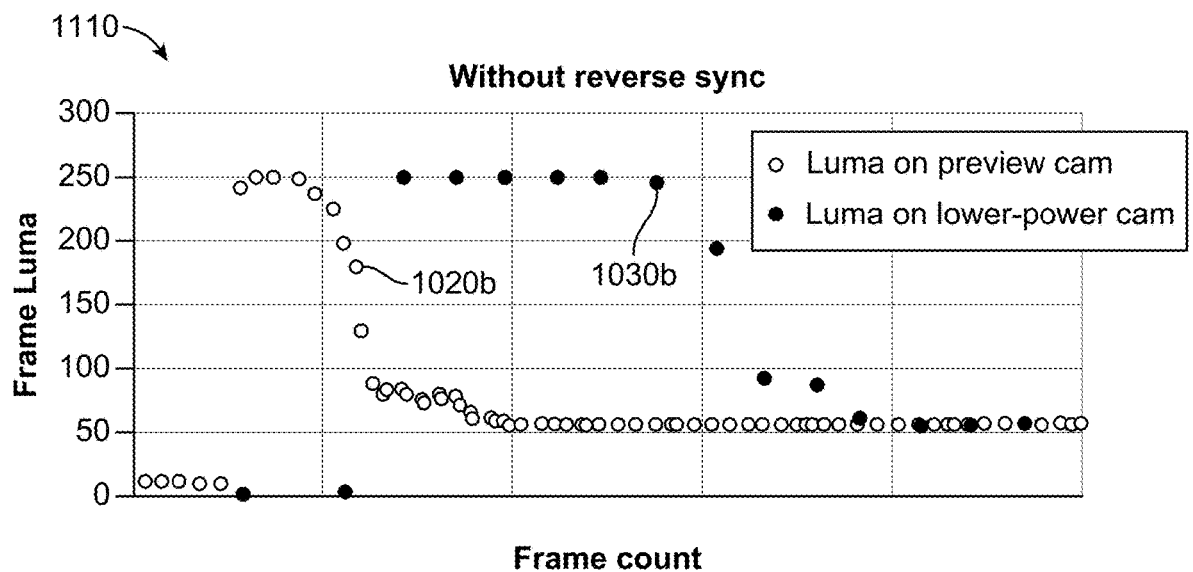
Figure 12:
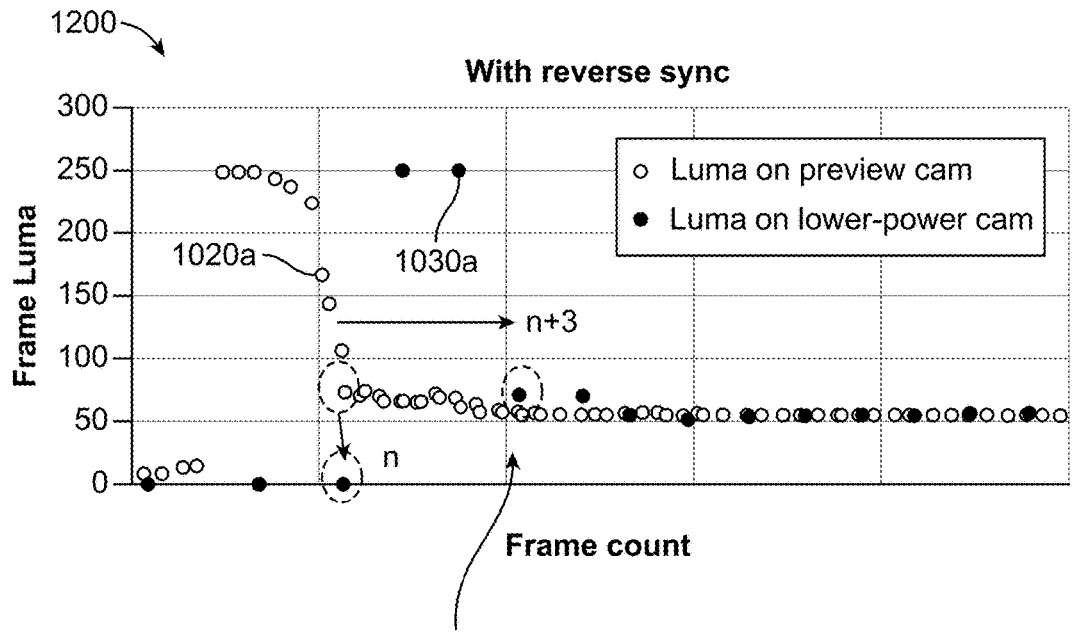
Figure 12:
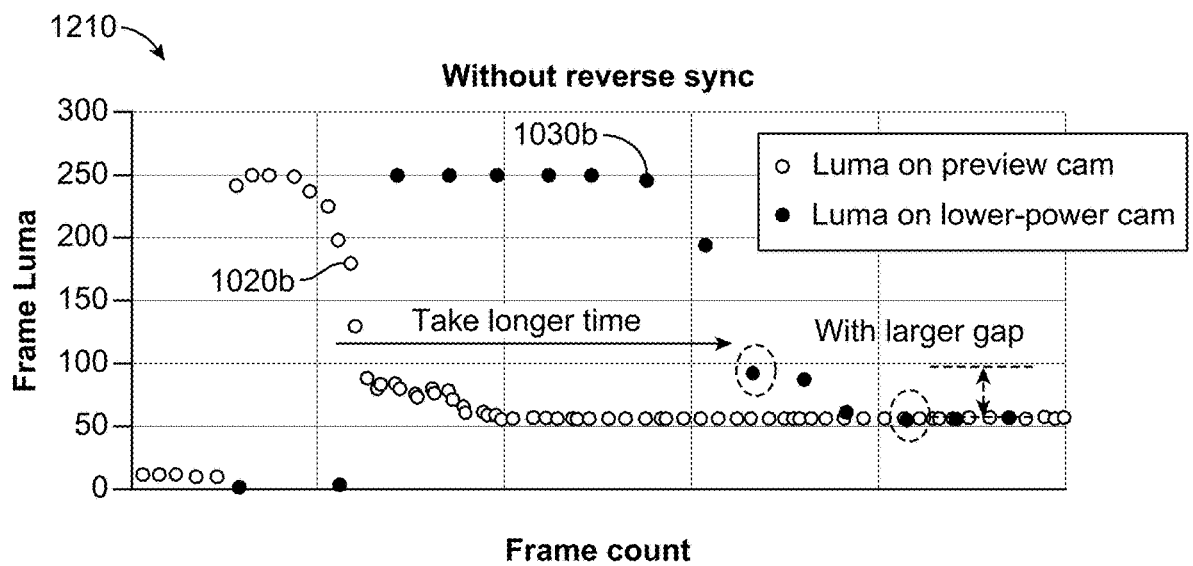

FIGS. 10, 11, and 12 together are graphs 1000, 1010, 1100, 1110, 1200, 1210 illustrating examples of frame luma for cameras operating with reverse synchronization and without reverse synchronization. In FIGS. 10, 11, and 12, the graphs show that when configuring a current exposure, one or more processors can allow an lower-power camera (e.g., AON camera) to follow the exposure settings (e.g., statistics) calculated from the current preview camera. This approach allows for a benefit from the high frame rate on the preview camera, similar to adding a light sensor to the lower-power camera.

In FIGS. 10, 11, and 12, the graphs 1000, 1100, 1200 plot similar curves for a multi-camera sync system using reverse synchronization. In graphs 1000, 1100, 1200, the x-axis represents image frame count (e.g., over time), and the y-axis represents frame luma. In the graphs 1000, 1100, 1200, a frame luma curve 1020a is plotted for the preview camera (e.g., a tele camera) operating at 30 FPS, and a frame luma curve 1030a is plotted for the lower-power camera (e.g., a wide camera in the form of an AON camera) operating at a reduced frame rate of 5 FPS. As shown in the graphs 1000, 1100, 1200, after the cameras have each been covered with a camera cover and the cover has been removed (e.g., from a dark lighting condition to a bright lighting condition), the frame luma curve 1020a of the preview camera operating at 30 FPS is shown to converge to normal brightness close to the same time as the frame luma curve 1030a of the lower-power camera operating at 5 FPS. With reverse synchronization, one or more processors can directly configure the converged value from the high FPS preview camera to the low FPS lower-power camera. As shown in graph 1200 of FIG. 12, the converged exposure can be reflected on the n+3 frames. As compared with the graph 1210 of FIG. 12, the convergence of the lower-power camera in graph 1200 is much faster and closer to the final converged value.

In FIGS. 10, 11, and 12, the graphs 1010, 1110, 1210 plot similar curves for a multi-camera sync system without using reverse synchronization. In graphs 1010, 1110, 1210, the x-axis represents image frame count (e.g., over time), and the y-axis represents frame luma. In the graphs 1010, 1110, 1210, a frame luma curve 1020b is plotted for the preview camera (e.g., a tele camera) operating at 30 FPS, and a frame luma curve 1030b is plotted for the lower-power camera (e.g., a wide camera in the form of an AON camera) operating at a reduced frame rate of 5 FPS. As shown in the graphs 1010, 1110, 1210, after the cameras have each been covered with a camera cover and the cover has been removed (e.g., from a dark lighting condition to a bright lighting condition), the frame luma curve 1020b of the preview camera operating at 30 FPS is shown to converge to normal brightness much more quickly than the frame luma curve 1030b of the lower-power camera operating at 5 FPS. Although the frame counts may be similar, without using reverse synchronization, it can take a longer time for a low FPS lower-power camera to converge to a desired value when the scene is changing.

Figure 13:
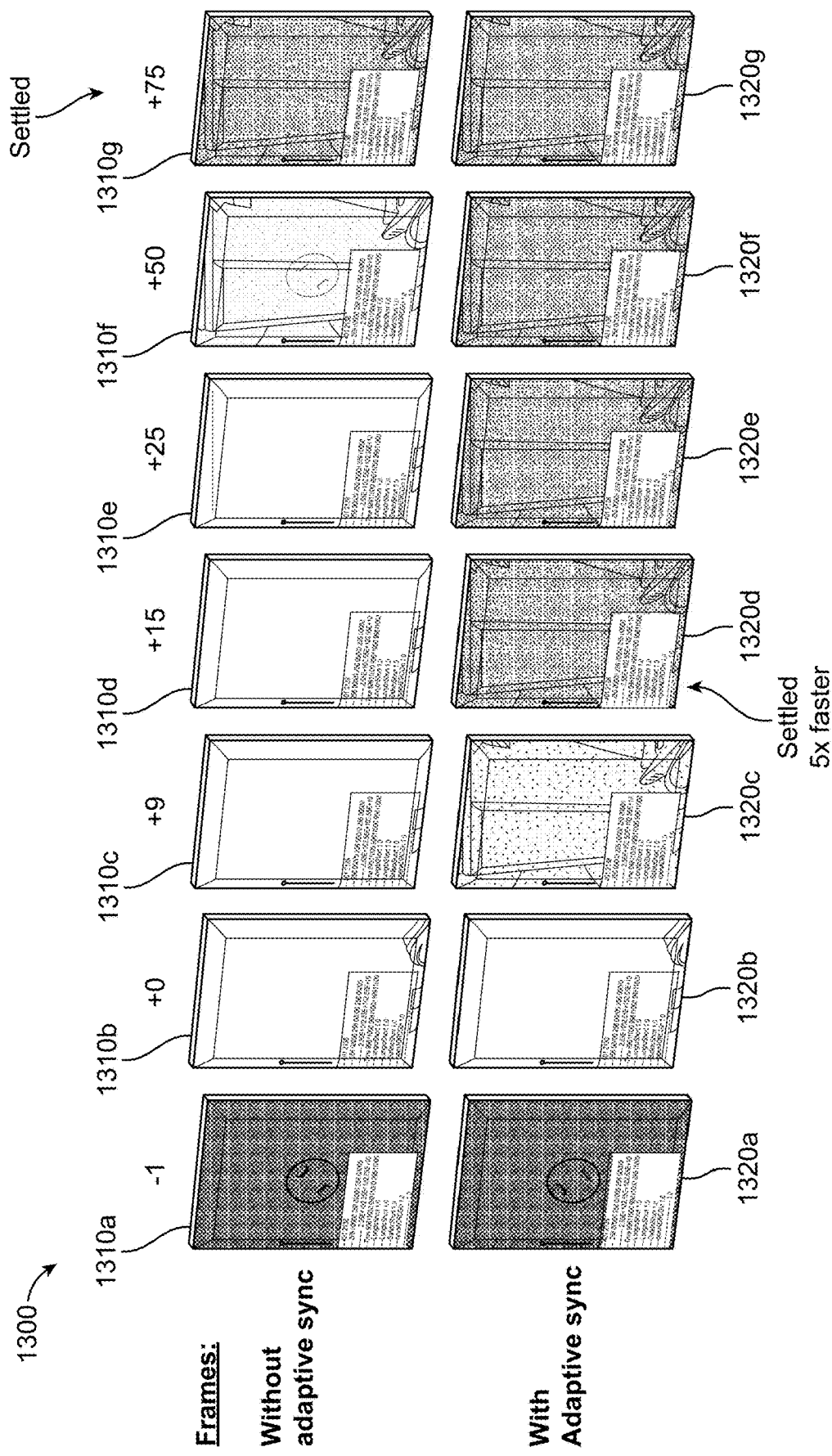
FIG. 13 is a diagram illustrating examples of image frames of a preview camera following the exposure control of an lower-power camera without adaptive synchronization and with adaptive synchronization, in accordance with some examples.

FIG. 13 is a diagram 1300 illustrating examples of image frames of a preview camera following the exposure control of an lower-power camera without adaptive synchronization and with adaptive synchronization. In particular, image frames 1310a, 1310b, 1310c, 1310d, 1310e, 1310f, 1310g of a preview camera following the exposure control of an lower-power camera without adaptive synchronization are shown, and image frames 1320a, 1320b, 1320c, 1320d, 1320e, 1320f, 1320g of a preview camera following the exposure control of an lower-power camera with adaptive synchronization are shown.

In FIG. 13, without adaptive synchronization, the image frames 1310a, 1310b, 1310c, 1310d, 1310e, 1310f, 1310g of a preview camera following the slow exposure control of an lower-power camera are shown to remain overexposed for an extended period of time when transitioning from a dark environment to a bright environment. In FIG. 13, at frame −1, both the preview camera and the lower-power camera are covered with their respective camera covers and, as such, the image frame 1310a at frame −1 is shown to be dark. At frame 0, the camera covers have been removed from both of the cameras and, as such, the image frame 1310b at frame 0 is shown to be overexposed. In FIG. 13, the image frames 1310b, 1310c, 1310d, 1310e, 1310f from frames 0 to 50 are shown to remain overexposed. The image frame 1310g shows that the preview camera does not converge to normal brightness until frame 75.

In FIG. 13, with adaptive synchronization, the image frames 1320a, 1320b, 1320c, 1320d, 1320e, 1320f, 1320g of a preview camera following the slow exposure control of an lower-power camera are shown to remain overexposed for a shortened period of time when transitioning from a dark environment to a bright environment. In FIG. 13, at frame −1, both the preview camera and the lower-power camera are covered with their respective camera covers and, as such, the image frame 1320a at frame −1 is shown to be dark. At frame 0, the camera covers have been removed from both of the cameras and, as such, the image frame 1320b at frame 0 is shown to be overexposed. In FIG. 13, the image frames 1310b, 1310c from frames 0 to 9 are shown to remain overexposed. The image frame 1320d shows that the preview camera converges to normal brightness as soon as frame 15.

Figure 14:
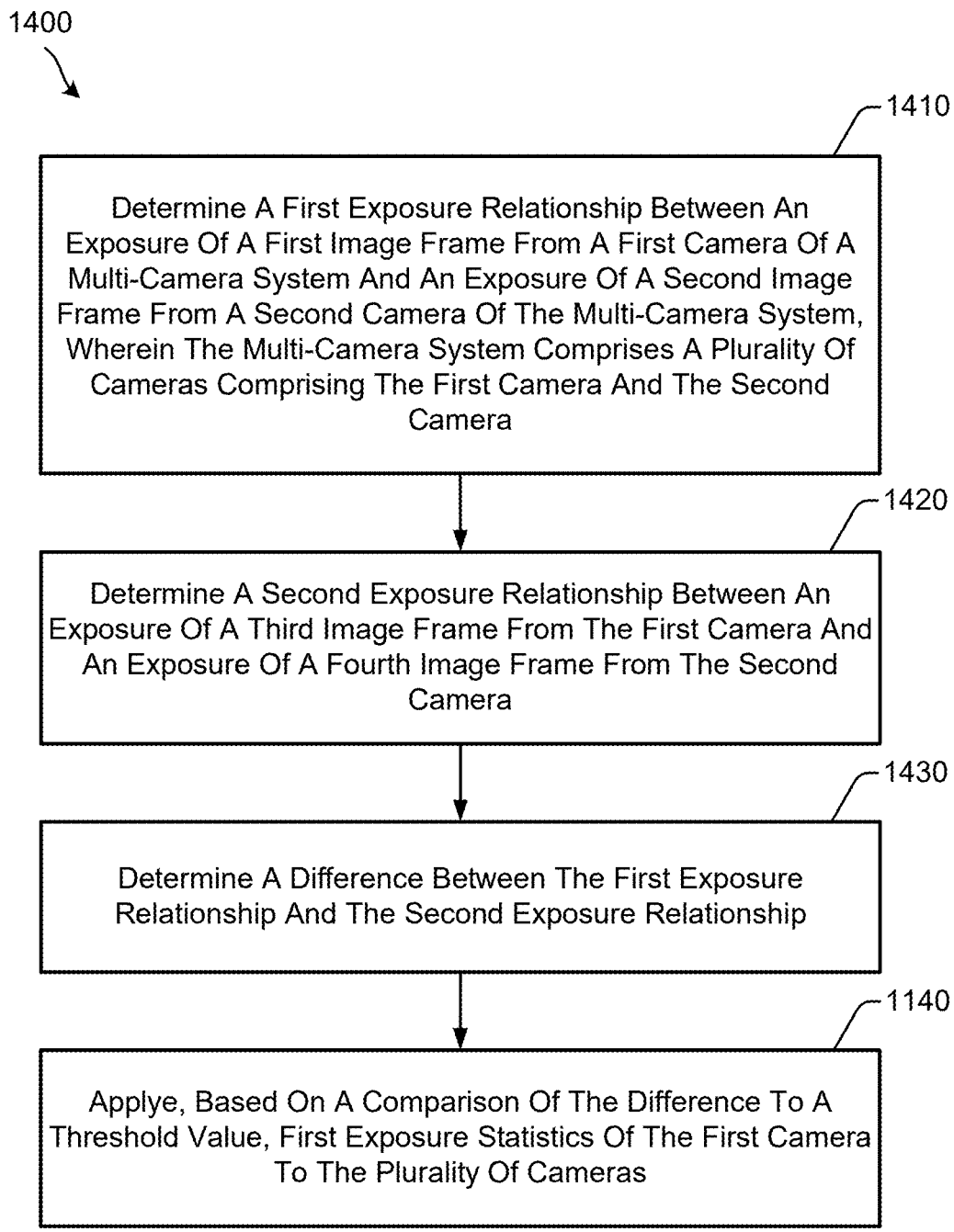
FIG. 14 is a flow diagram illustrating an example of a process for image processing, in accordance with some examples.

FIG. 14A is a flow chart illustrating an example of a process 1400 for image processing. The process 1400 can be performed by a computing device (e.g., image processing device 105B of FIG. 1, image processing system 200 of FIG. 2, a computing device or computing system 1500 of FIG. 15) or by a component or system (e.g., a chipset, one or more processors such as one or more central processing units (CPUs), digital signal processors (DSPs), graphics processing units (GPUs), any combination thereof, and/or other type of processor(s), or other component or system) of the computing device. The operations of the process 1400 may be implemented as software components that are executed and run on one or more processors (e.g., processor 1510 of FIG. 15 or other processor(s)). Further, the transmission and reception of signals by the computing device in the process 1400 may be enabled, for example, by one or more antennas and/or one or more transceivers (e.g., wireless transceiver (s)).

At block 1410, the computing device (or component thereof) can determine a first exposure relationship between an exposure of a first image frame from a first camera of a multi-camera system and an exposure of a second image frame from a second camera of the multi-camera system. The multi-camera system includes a plurality of cameras, including the first camera and the second camera (and in some cases one or more additional cameras). In some aspects, the first exposure relationship between the exposure of the first image frame and the exposure of the second image frame includes an exposure relationship (e.g., an exposure ratio) of the exposure of the first image frame over the exposure of the second image frame. In one illustrative example, referring to FIG. 7, an exposure relationship between frame 4 from the preview camera and frame 4 from the lower-power camera is such that the exposure values are the same (both have an exposure value of 50). For instance, a ratio between the exposure value of frame 4 from the preview camera and the exposure value of frame 4 from the lower-power camera is equal to 1.

In some aspects, the first camera is a preview camera (e.g., a telephoto camera) and the second camera is a lower-power camera (e.g., an always-on (AON) camera, always sensing camera (ASC), or other lower-power camera). In some cases, the second camera operates at a lower frames per second (FPS) than the first camera. Additionally or alternatively, in some cases, the second camera has a different field of view (FOV) than the first camera.

At block 1420, the computing device (or component thereof) can determine a second exposure relationship between an exposure of a third image frame from the first camera and an exposure of a fourth image frame from the second camera. In some aspects, the second exposure relationship between the exposure of the third image frame and the exposure of the fourth image frame includes an exposure relationship (e.g., an exposure ratio) of the exposure of the third image frame over the exposure of the fourth image frame. In one illustrative example, referring again to FIG. 7, an exposure relationship between frame 5 from the preview camera and frame 5 from the lower-power camera is such that the exposure values are different (the exposure value of frame 5 from the preview camera is equal to 100 and the exposure value of frame 5 from the lower-power camera is equal to 50). For instance, a ratio between the exposure value of frame 5 from the preview camera and the exposure value of frame 5 from the lower-power camera is equal to 0.5 ($^{50}/_{100}$).

At block 1430, the computing device (or component thereof) can determine a difference between the second exposure relationship and the first exposure relationship. In some cases, the difference is further based on an absolute value of the difference between the first exposure relationship and the second exposure relationship (e.g., denoted as abs($Ratio_{n+1}$–$Ratio_n$), as shown in FIG. 8). In one illustrative example, referring again to FIG. 7, a difference between the exposure relationship of frame 5 and frame 4 includes a value of 0.5 (1−0.5).

At block 1440, the computing device (or component thereof) can apply, based on a comparison of the difference to a threshold value, first exposure statistics of the first camera to the plurality of cameras. For example, the computing device (or component thereof) can apply, to the plurality of cameras of the multi-camera system, the first exposure statistics of the first camera based on the difference being greater than the threshold value (e.g., a yes decision at block 830 of FIG. 8).

In some aspects, the computing device (or component thereof) can determine a third exposure relationship between an exposure of a fifth image frame from the first camera and an exposure of a sixth image frame from the second camera. The computing device (or component thereof) can determine a difference between the third exposure relationship and the second exposure relationship. The computing device (or component thereof) can apply, to the plurality of cameras of the multi-camera system, second exposure statistics of the second camera based on a difference between the third exposure relationship and the second exposure relationship being less than the threshold value for a certain duration of time after applying the first exposure statistics of the first camera to the plurality of cameras. In one illustrative example, referring to FIG. 7, at frame 20, the difference remains below the threshold for the certain duration, indicating that the scene is stable.

In some cases, the computing device(s) configured to perform the processes described herein (e.g., the process 1400 and/or other process described herein) may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the Wi-Fi (802.11x) standards, data according to the Bluetooth™ standard, data according to the Internet Protocol (IP) standard, and/or other types of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 1400 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (e.g., the process 1400 and/or other process described herein) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 15:
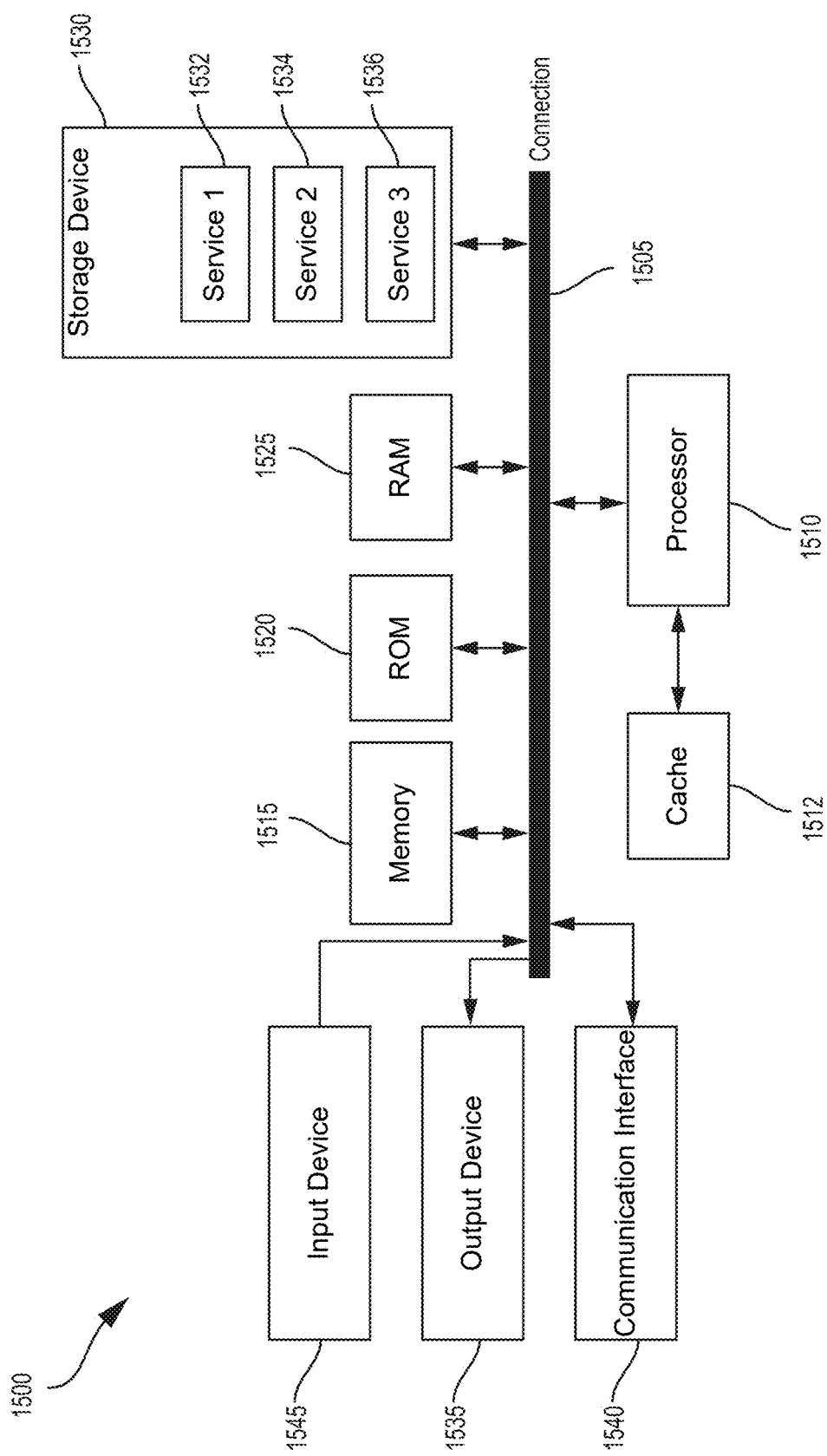
FIG. 15 is a diagram illustrating an example of a system for implementing certain aspects described herein.

FIG. 15 is a block diagram illustrating an example of a computing system 1500, which may be employed for an adaptive sync for an AEC always-on low FPS sync solution. In particular, FIG. 15 illustrates an example of computing system 1500, which can be for example any computing device making up internal computing system, a remote computing system, a camera, or any component thereof in which the components of the system are in communication with each other using connection 1505. Connection 1505 can be a physical connection using a bus, or a direct connection into processor 1510, such as in a chipset architecture. Connection 1505 can also be a virtual connection, networked connection, or logical connection.

In some aspects, computing system 1500 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1500 includes at least one processing unit (CPU or processor) 1510 and connection 1505 that communicatively couples various system components including system memory 1515, such as read-only memory (ROM) 1520 and random access memory (RAM) 1525 to processor 1510. Computing system 1500 can include a cache 1512 of high-speed memory connected directly with, in close proximity to, or integrated as part of processor 1510.

Processor 1510 can include any general purpose processor and a hardware service or software service, such as services 1532, 1534, and 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction, computing system 1500 includes an input device 1545, which can represent any number of input mechanisms, such as a microphone for speech, a touch-sensitive screen for gesture or graphical input, keyboard, mouse, motion input, speech, etc. Computing system 1500 can also include output device 1535, which can be one or more of a number of output mechanisms. In some instances, multimodal systems can enable a user to provide multiple types of input/output to communicate with computing system 1500.

Computing system 1500 can include communications interface 1540, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1540 may also include one or more range sensors (e.g., LIDAR sensors, laser range finders, RF radars, ultrasonic sensors, and infrared (IR) sensors) configured to collect data and provide measurements to processor 1510, whereby processor 1510 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1540 may also include one or more Global Navigation Satellite System (GNSS) receivers or transceivers that are used to determine a location of the computing system 1500 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1530 can include software services, servers, services, etc., that when the code that defines such software is executed by the processor 1510, it causes the system to perform a function. In some aspects, a hardware service that performs a particular function can include the software component stored in a computer-readable medium in connection with the necessary hardware components, such as processor 1510, connection 1505, output device 1535, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, engines, circuits, and algorithm steps described in connection with the embodiments disclosed herein may be implemented as electronic hardware, computer software, firmware, or combinations thereof. To clearly illustrate this interchangeability of hardware and software, various illustrative components, blocks, engines, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as engines, modules, or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. An apparatus for exposure control, the apparatus comprising: at least one memory; and at least one processor coupled to the at least one memory and configured to: determine a first exposure relationship between an exposure of a first image frame from a first camera of a multi-camera system and an exposure of a second image frame from a second camera of the multi-camera system, wherein the multi-camera system comprises a plurality of cameras comprising the first camera and the second camera; determine a second exposure relationship between an exposure of a third image frame from the first camera and an exposure of a fourth image frame from the second camera; determine a difference between the second exposure relationship and the first exposure relationship; and apply, based on a comparison of the difference to a threshold value, first exposure statistics of the first camera to the plurality of cameras.

Aspect 2. The apparatus of Aspect 1, wherein the at least one processor is configured to: apply, to the plurality of cameras of the multi-camera system, the first exposure statistics of the first camera based on the difference being greater than the threshold value.

Aspect 3. The apparatus of Aspect 2, wherein the at least one processor is configured to: determine a third exposure relationship between an exposure of a fifth image frame from the first camera and an exposure of a sixth image frame from the second camera; determine a difference between the third exposure relationship and the second exposure relationship; and apply, to the plurality of cameras of the multi-camera system, second exposure statistics of the second camera based on a difference between the third exposure relationship and the second exposure relationship being less than the threshold value for a certain duration of time after applying the first exposure statistics of the first camera to the plurality of cameras.

Aspect 4. The apparatus of any one of Aspects 1 to 3, wherein the first exposure relationship between the exposure of the first image frame and the exposure of the second image frame comprises an exposure relationship of the exposure of the first image frame over the exposure of the second image frame.

Aspect 5. The apparatus of any one of Aspects 1 to 4, wherein the difference is further based on an absolute value of the difference between the first exposure relationship and the second exposure relationship.

Aspect 6. The apparatus of any one of Aspects 1 to 5, wherein the first camera is a preview camera.

Aspect 7. The apparatus of Aspect 6, wherein the preview camera is a telephoto camera.

Aspect 8. The apparatus of any one of Aspects 1 to 7, wherein the second camera is a lower-power camera.

Aspect 9. The apparatus of Aspect 8, wherein the lower-power camera is an always-on (AON) camera.

Aspect 10. The apparatus of any one of Aspects 1 to 9, wherein the second camera operates at a lower frames per second (FPS) than the first camera.

Aspect 11. The apparatus of any one of Aspects 1 to 10, wherein the second camera has a different field of view (FOV) than the first camera.

Aspect 12. A method for exposure control, the method comprising: determining a first exposure relationship between an exposure of a first image frame from a first camera of a multi-camera system and an exposure of a second image frame from a second camera of the multi-camera system, wherein the multi-camera system comprises a plurality of cameras comprising the first camera and the second camera; determining a second exposure relationship between an exposure of a third image frame from the first camera and an exposure of a fourth image frame from the second camera; determining a difference between the second exposure relationship and the first exposure relationship; and applying, based on a comparison of the difference to a threshold value, first exposure statistics of the first camera to the plurality of cameras.

Aspect 13. The method of Aspect 12, further comprising: applying, to the plurality of cameras of the multi-camera system, the first exposure statistics of the first camera based on the difference being greater than the threshold value.

Aspect 14. The method of Aspect 13, further comprising: determining a third exposure relationship between an exposure of a fifth image frame from the first camera and an exposure of a sixth image frame from the second camera; determining a difference between the third exposure relationship and the second exposure relationship; and applying, to the plurality of cameras of the multi-camera system, second exposure statistics of the second camera based on a difference between the third exposure relationship and the second exposure relationship being less than the threshold value for a certain duration of time after applying the first exposure statistics of the first camera to the plurality of cameras.

Aspect 15. The method of any one of Aspects 12 to 14, wherein the first exposure relationship between the exposure of the first image frame and the exposure of the second image frame comprises an exposure relationship of the exposure of the first image frame over the exposure of the second image frame.

Aspect 16. The method of any one of Aspects 12 to 15, wherein the difference is further based on an absolute value of the difference between the first exposure relationship and the second exposure relationship.

Aspect 17. The method of any one of Aspects 12 to 16, wherein the first camera is a preview camera.

Aspect 18. The method of Aspect 17, wherein the preview camera is a telephoto camera.

Aspect 19. The method of any one of Aspects 12 to 18, wherein the second camera is a lower-power camera.

Aspect 20. The method of Aspect 19, wherein the lower-power camera is an always-on (AON) camera.

Aspect 21. The method of any one of Aspects 12 to 20, wherein the second camera operates at a lower frames per second (FPS) than the first camera.

Aspect 22. The method of any one of Aspects 12 to 21, wherein the second camera has a different field of view (FOV) than the first camera.

Aspect 23. A non-transitory computer-readable medium having stored thereon instructions that, when executed by one or more processors, cause the one or more processors to perform operations according to any of Aspects 11 to 22.

Aspect 24. An apparatus for exposure control, the apparatus including one or more means for performing operations according to any of Aspects 11 to 22.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. An apparatus for exposure control, the apparatus comprising:
at least one memory; and
at least one processor coupled to the at least one memory and configured to:
determine a first exposure relationship between an exposure of a first image frame from a first camera of a multi-camera system and an exposure of a second image frame from a second camera of the multi-camera system, wherein the multi-camera system comprises a plurality of cameras comprising the first camera and the second camera;
determine a second exposure relationship between an exposure of a third image frame from the first camera and an exposure of a fourth image frame from the second camera;
determine a difference between the second exposure relationship and the first exposure relationship; and
apply, based on a comparison of the difference to a threshold value, first exposure statistics of the first camera to the plurality of cameras.

2. The apparatus of claim 1, wherein the at least one processor is configured to:
apply, to the plurality of cameras of the multi-camera system, the first exposure statistics of the first camera based on the difference being greater than the threshold value.

3. The apparatus of claim 2, wherein the at least one processor is configured to:
determine a third exposure relationship between an exposure of a fifth image frame from the first camera and an exposure of a sixth image frame from the second camera;
determine a difference between the third exposure relationship and the second exposure relationship; and
apply, to the plurality of cameras of the multi-camera system, second exposure statistics of the second camera based on a difference between the third exposure relationship and the second exposure relationship being less than the threshold value for a certain duration of time after applying the first exposure statistics of the first camera to the plurality of cameras.

4. The apparatus of claim 1, wherein the first exposure relationship between the exposure of the first image frame and the exposure of the second image frame comprises an exposure relationship of the exposure of the first image frame over the exposure of the second image frame.

5. The apparatus of claim 1, wherein the difference is further based on an absolute value of the difference between the first exposure relationship and the second exposure relationship.

6. The apparatus of claim 1, wherein the first camera is a preview camera.

7. The apparatus of claim 6, wherein the preview camera is a telephoto camera.

8. The apparatus of claim 1, wherein the second camera is a lower-power camera.

9. The apparatus of claim 8, wherein the lower-power camera is an always-on (AON) camera.

10. The apparatus of claim 1, wherein the second camera operates at a lower frames per second (FPS) than the first camera.

11. The apparatus of claim 1, wherein the second camera has a different field of view (FOV) than the first camera.

12. A method for exposure control, the method comprising:
- determining a first exposure relationship between an exposure of a first image frame from a first camera of a multi-camera system and an exposure of a second image frame from a second camera of the multi-camera system, wherein the multi-camera system comprises a plurality of cameras comprising the first camera and the second camera;
- determining a second exposure relationship between an exposure of a third image frame from the first camera and an exposure of a fourth image frame from the second camera;
- determining a difference between the second exposure relationship and the first exposure relationship; and
- applying, based on a comparison of the difference to a threshold value, first exposure statistics of the first camera to the plurality of cameras.

13. The method of claim 12, further comprising:
- applying, to the plurality of cameras of the multi-camera system, the first exposure statistics of the first camera based on the difference being greater than the threshold value.

14. The method of claim 13, further comprising:
- determining a third exposure relationship between an exposure of a fifth image frame from the first camera and an exposure of a sixth image frame from the second camera;
- determining a difference between the third exposure relationship and the second exposure relationship; and
- applying, to the plurality of cameras of the multi-camera system, second exposure statistics of the second camera based on a difference between the third exposure relationship and the second exposure relationship being less than the threshold value for a certain duration of time after applying the first exposure statistics of the first camera to the plurality of cameras.

15. The method of claim 12, wherein the first exposure relationship between the exposure of the first image frame and the exposure of the second image frame comprises an exposure relationship of the exposure of the first image frame over the exposure of the second image frame.

16. The method of claim 12, wherein the difference is further based on an absolute value of the difference between the first exposure relationship and the second exposure relationship.

17. The method of claim 12, wherein the first camera is a preview camera.

18. The method of claim 12, wherein the second camera is a lower-power camera.

19. The method of claim 12, wherein the second camera operates at a lower frames per second (FPS) than the first camera.

20. The method of claim 12, wherein the second camera has a different field of view (FOV) than the first camera.

* * * * *